(12) United States Patent
Bliss et al.

(10) Patent No.: US 10,867,419 B2
(45) Date of Patent: *Dec. 15, 2020

(54) GEOCODING PERSONAL INFORMATION

(71) Applicant: Google LLC, Mountain View, CA (US)

(72) Inventors: Adam Bliss, Drain, OR (US); David P. Conway, Los Altos, CA (US)

(73) Assignee: Google LLC, Mountain View, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/999,550

(22) Filed: Aug. 20, 2018

(65) Prior Publication Data

US 2019/0073807 A1 Mar. 7, 2019

Related U.S. Application Data

(63) Continuation of application No. 14/721,881, filed on May 26, 2015, now Pat. No. 10,055,862, which is a continuation of application No. 13/295,490, filed on Nov. 14, 2011, now Pat. No. 9,069,865, which is a continuation of application No. 12/256,078, filed on Oct. 22, 2008, now Pat. No. 8,060,582.

(51) Int. Cl.

| G06F 15/16 | (2006.01) |
|---|---|
| G06T 11/20 | (2006.01) |
| G06F 16/9537 | (2019.01) |
| G01C 21/00 | (2006.01) |
| G06F 17/15 | (2006.01) |
| G06T 11/60 | (2006.01) |
| G09G 5/00 | (2006.01) |

(52) U.S. Cl.
CPC .............. *G06T 11/20* (2013.01); *G01C 21/00* (2013.01); *G06F 16/9537* (2019.01); *G06F 17/15* (2013.01); *G06T 11/60* (2013.01); *G09G 5/003* (2013.01)

(58) Field of Classification Search
CPC .......... H04L 29/0809; H04L 29/08072; G06F 16/9537; G09G 5/003; G06T 11/20
See application file for complete search history.

(56) References Cited

U.S. PATENT DOCUMENTS

| 6,647,414 B1 | 11/2003 | Eriksson et al. |
|---|---|---|
| 6,691,029 B2 | 2/2004 | Hughes et al. |

(Continued)

FOREIGN PATENT DOCUMENTS

| CN | 1408097 | 4/2003 |
|---|---|---|
| CN | 1481498 | 3/2004 |

(Continued)

OTHER PUBLICATIONS

NPL google (Year: 2020).*

(Continued)

*Primary Examiner* — Razu A Miah
(74) *Attorney, Agent, or Firm* — Fish & Richardson P.C.

(57) ABSTRACT

A computer-implemented method for generating geocoded user information is disclosed. The method comprises searching user data across multiple different data corpuses for entries having location-related information and determining locations for the location-related information. The method further comprises generating a map showing a current location of a mobile device along with representations of the entries having location-related information, at the determined locations, for entries from the multiple different data corpuses.

18 Claims, 12 Drawing Sheets

(56) References Cited

U.S. PATENT DOCUMENTS

| | | | |
|---|---|---|---|
| 6,850,837 B2 | 2/2005 | Paulauskas et al. | |
| 6,944,447 B2* | 9/2005 | Portman | G06Q 10/06 455/422.1 |
| 6,993,538 B2 | 1/2006 | Gray | |
| 7,010,564 B2* | 3/2006 | Morimoto | G06F 16/29 709/200 |
| 7,216,153 B2 | 5/2007 | Allen et al. | |
| 7,631,032 B1 | 12/2009 | Refuah et al. | |
| 7,693,947 B2* | 4/2010 | Judge | H04L 41/12 709/206 |
| 7,801,950 B2* | 9/2010 | Eisenstadt | G06F 16/958 709/203 |
| 8,060,582 B2* | 11/2011 | Bliss | G06T 11/60 709/218 |
| 8,260,880 B1 | 9/2012 | Gerba | |
| 2001/0028304 A1 | 10/2001 | I'Anson et al. | |
| 2001/0029184 A1 | 10/2001 | I'Anson et al. | |
| 2001/0052861 A1 | 12/2001 | Ohmura et al. | |
| 2002/0026489 A1 | 2/2002 | Homma | |
| 2002/0049742 A1 | 4/2002 | Chan et al. | |
| 2002/0059399 A1 | 5/2002 | Learmonth | |
| 2002/0080048 A1 | 6/2002 | Choi | |
| 2002/0116472 A1 | 8/2002 | Kalish et al. | |
| 2002/0160766 A1 | 10/2002 | Portman et al. | |
| 2002/0165910 A1 | 11/2002 | Brown et al. | |
| 2003/0004639 A1 | 1/2003 | Punkka | |
| 2003/0074471 A1* | 4/2003 | Anderson | H04L 29/12009 709/245 |
| 2003/0084098 A1 | 5/2003 | Lavin et al. | |
| 2003/0105587 A1 | 6/2003 | Kim | |
| 2003/0120637 A1 | 6/2003 | Chithambaram | |
| 2003/0126150 A1 | 7/2003 | Chan | |
| 2003/0184594 A1* | 10/2003 | Ellenby | G01C 21/20 715/810 |
| 2003/0191578 A1 | 10/2003 | Paulauskas et al. | |
| 2003/0195008 A1 | 10/2003 | Mohi | |
| 2004/0006425 A1 | 1/2004 | Wood et al. | |
| 2004/0019698 A1* | 1/2004 | Najafi | H04L 29/06 709/245 |
| 2004/0054468 A1 | 3/2004 | Yamada et al. | |
| 2004/0073538 A1* | 4/2004 | Leishman | G06Q 30/02 |
| 2004/0098464 A1 | 5/2004 | Koch et al. | |
| 2004/0133467 A1 | 7/2004 | Siler | |
| 2004/0150678 A1* | 8/2004 | Jeong | G09G 5/003 715/867 |
| 2004/0167706 A1 | 8/2004 | Becker | |
| 2005/0149617 A1* | 7/2005 | Turnbull | H04M 3/42323 709/203 |
| 2005/0192946 A1 | 9/2005 | Lu et al. | |
| 2005/0246238 A1 | 11/2005 | Dvorak | |
| 2005/0251331 A1* | 11/2005 | Kreft | G01C 3/08 701/438 |
| 2005/0278378 A1 | 12/2005 | Frank | |
| 2006/0020468 A1 | 1/2006 | Hilliard | |
| 2006/0123014 A1 | 6/2006 | Ng | |
| 2006/0129636 A1* | 6/2006 | Matsuura | G01C 21/3682 709/203 |
| 2006/0195259 A1* | 8/2006 | Pinkus | G01C 21/362 701/431 |
| 2006/0210114 A1 | 9/2006 | Oka et al. | |
| 2006/0271517 A1 | 11/2006 | Deloach, Jr. | |
| 2006/0287995 A1 | 12/2006 | Quince | |
| 2007/0038950 A1 | 2/2007 | Taniguchi | |
| 2007/0088818 A1 | 4/2007 | Roberts et al. | |
| 2007/0118520 A1* | 5/2007 | Bliss | G01C 21/367 |
| 2007/0173956 A1 | 7/2007 | Koch | |
| 2007/0225902 A1* | 9/2007 | Gretton | G01C 21/26 701/533 |
| 2007/0244634 A1* | 10/2007 | Koch | G01C 21/00 |
| 2007/0245310 A1 | 10/2007 | Rosenstein | |
| 2007/0271328 A1 | 11/2007 | Geelen et al. | |
| 2007/0271367 A1* | 11/2007 | Yardeni | H04L 67/36 709/223 |
| 2007/0273558 A1* | 11/2007 | Smith | G09B 29/007 340/995.1 |
| 2008/0010605 A1* | 1/2008 | Frank | G06F 16/38 715/765 |
| 2008/0033935 A1* | 2/2008 | Frank | G06F 3/0481 |
| 2008/0065685 A1* | 3/2008 | Frank | G06F 16/9537 |
| 2008/0109718 A1* | 5/2008 | Narayanaswami | G06Q 10/109 715/262 |
| 2008/0172244 A1 | 7/2008 | Coupal et al. | |
| 2008/0172380 A1 | 7/2008 | Czyz | |
| 2008/0189032 A1 | 8/2008 | Beadman | |
| 2008/0195978 A1 | 8/2008 | Wissenbach et al. | |
| 2008/0201156 A1 | 8/2008 | Abhyanker | |
| 2008/0214204 A1 | 9/2008 | Ramer et al. | |
| 2008/0250337 A1 | 10/2008 | Lemmela et al. | |
| 2008/0280600 A1* | 11/2008 | Zhou | H04M 1/2745 455/415 |
| 2008/0281510 A1 | 11/2008 | Shahine | |
| 2008/0281854 A1 | 11/2008 | Abhyanker | |
| 2009/0005981 A1 | 1/2009 | Forstall et al. | |
| 2009/0073191 A1* | 3/2009 | Smith | G06F 16/29 345/629 |
| 2009/0132941 A1* | 5/2009 | Pilskalns | G06F 16/9537 715/764 |
| 2009/0177996 A1* | 7/2009 | Hunt | G09G 5/003 715/788 |
| 2009/0319187 A1* | 12/2009 | Deeming | G06Q 30/02 701/300 |
| 2009/0327071 A1* | 12/2009 | Kreft | G06F 16/2379 705/14.49 |
| 2010/0106801 A1* | 4/2010 | Bliss | G01C 21/00 709/219 |
| 2010/0274889 A1* | 10/2010 | Carter | H04L 29/0809 709/224 |
| 2010/0289644 A1 | 11/2010 | Slavin et al. | |
| 2011/0035384 A1 | 2/2011 | Qiu | |
| 2011/0238780 A1* | 9/2011 | Neitzel | G06F 16/972 709/217 |
| 2011/0320319 A1* | 12/2011 | Streich | G06Q 30/06 705/27.1 |
| 2012/0096071 A1* | 4/2012 | Murphey | G06F 8/63 709/203 |
| 2013/0086215 A1* | 4/2013 | Trotta | G06F 16/29 709/217 |
| 2013/0246560 A1* | 9/2013 | Feng | H04L 29/0809 709/217 |
| 2014/0237051 A1 | 8/2014 | Abhyanker | |
| 2015/0149587 A1* | 5/2015 | Wang | G06F 16/13 709/217 |
| 2015/0206327 A1* | 7/2015 | Lauenstein | G06F 16/254 345/440 |
| 2015/0207754 A1* | 7/2015 | Johnson | H04L 47/125 709/226 |

FOREIGN PATENT DOCUMENTS

| | | |
|---|---|---|
| CN | 101038177 | 9/2007 |
| CN | 101341487 | 1/2009 |
| CN | 101398308 | 4/2009 |
| JP | H08-050594 | 2/1996 |
| JP | 2001-092878 | 4/2001 |
| JP | 2001-337933 | 12/2001 |
| JP | 2003-130662 | 5/2003 |
| JP | 2003-130672 | 5/2003 |
| JP | 2004-102175 | 4/2004 |
| JP | 2004-272217 | 9/2004 |
| KR | 10-2005-0038671 | 4/2005 |
| KR | 20060122620 | 11/2006 |
| WO | 2007/069361 | 6/2007 |

OTHER PUBLICATIONS

NPL IP.com (Year: 2020).*
Extended European Search Report in European Application No. 19170919.5, dated Jul. 4, 2019, 8 pages.
U.S. Appl. No. 14/721,881, filed May 26, 2015.

(56) References Cited

OTHER PUBLICATIONS

U.S. Appl. No. 13/295,490, filed Nov. 14, 2011.
U.S. Appl. No. 12/256,078, filed Oct. 22, 2008.
'googlepress.blogspot.de'[online] "Google Announces Launch of Google Maps for Mobile with "My Location" Technology—News announcements" News from Google, Nov. 28, 2007, [retrieved on Dec. 14, 2017] Retrieved from Internet: URL<http://googlepress.blogspot.de/2007/11/google-announces-launch-of-google-maps_28.html> 2 pages.
Beate Giffo-Schmitt, Authorized Officer, International Preliminary Report on Patentability for International Application No. PCT/US2009/061418, dated May 5. 2011, 7 pages (no new art).
Chinese Office Action in Chinese Application No. 20098015186.7, dated Jan. 14, 2013, 17 pages (including English Translation).
Chinese Office Action in Chinese Application No. 20098015186.7, dated Mar. 7, 2014, 6 pages (no English translation) (no new art).
Chinese Office Action in Chinese Application No. 20098015186.7, dated Sep. 11, 2014, 17 pages (with English translation) (no new art).
Japanese Office Action in Japanese Application No. 2011-533286, dated Oct. 22, 2013, 6 pages.
Japanese Office Action in Japanese Application No. 2011-533286, dated Apr. 21, 2014, 14 pages (with English translation) (no new art).
Karin Sommermeyer, Authorized Officer, International Search Report for International Application No. PCT/US2009/061418, dated Mar. 8, 2010. 27 pages.
Office Action issued in European Application No. 09744842.7, dated Jan. 2, 2018, 9 pages.
Office Action issued in Indian Application No. 3311/CHENP/2011, dated Sep. 14, 2018, 6 pages (with English Translation).
Office Action issued in Japanese Application No. 2011-533286 dated Apr. 4 2017, 5 pages (English translation) (No art).
Office Action issued in Japanese Application No. 2015-007091 dated Apr. 5, 2016, 13 pages (with English translation).
Office Action issued in Japanese Application No. 2015-533286, dated Oct. 4, 2016, 5 pages, (English Translation) (no new art).
Office Action issued in Korean Application No. 10-2011-7011633 dated Aug. 13, 2015, 17 pages (with English translation).
Reexamination Action issued in Chinese Application No. 200980151886.7, dated Jul. 18, 2016, 20 pages (with English Summary) (No new art).
EP Office Action issued in European Application No. 097448427, dated Feb. 15, 2019, 14 pages.
CN First Office Action in Chinese Appln. No. 201710115769, dated Nov. 13, 2019.

* cited by examiner

GEOCODING PERSONAL INFORMATION

CROSS-REFERENCE TO RELATED APPLICATIONS

This application is a continuation application of and claims the benefit of priority to U.S. application Ser. No. 14/721,881, filed on May 26, 2015, which is a continuation of and claims the benefit of priority to U.S. application Ser. No. 13/295,490, filed on Nov. 14, 2011, which is a continuation application of and claims the benefit of priority to U.S. application Ser. No. 12/256,078, filed on Oct. 22, 2008, the entire contents of which are incorporated by reference.

TECHNICAL FIELD

The instant specification relates to incorporating personal data into electronic displays.

BACKGROUND

With the advent of web based personal information management (PIM) programs such as calendars, address books, and task lists, people who spend much of their time away from their home or office have come to depend on these web applications to manage their everyday affairs. In fact, online or mobile PIM applications are often the only place that some users record important personal information. Although modern portable computing devices such as personal digital assistants (PDAs) and smartphones sometimes allow users to access information stored on the Internet without being tethered to a particular location, PDAs generally force the user to view the information in a vacuum, i.e., without the context provided by information stored on other devices or in another Internet applications.

Context may be especially important when the user is unable to focus solely on the portable computing device, e.g., when the user is driving a motor vehicle. For instance, as the user is driving, the user may need driving directions provided by a navigation system and, simultaneously, want contact information stored in a web application accessible by a PDA. Switching focus between the road, the navigation system, and the PDA may have disastrous consequences for not only the driver, but also for others on the road.

SUMMARY

In general, this document describes enhancing visual displays or other outputs (e.g., auditory or tactile) with personal data. In particular, location-related data associated with entries in a user's many personal applications may be scraped from those applications, and icons for the entries may be superimposed over a map on a portable computing device of the user. Such personal applications may include task, appointment or calendar, and contacts applications, and the location-related information can include information such as a contact's address, or address information listed in a description for an upcoming meeting. The location-related information can be geocoded, and an icon for each such entry can then be displayed over a map that shows the user's current location, such as a map on a personal navigation device (which may be a mobile smartphone running a mapping application).

For example, a user may store personal data in one or more applications and physical locations corresponding to the personal data may be determined. As a user nears one or more of the physical locations corresponding to personal data, the display of a mobile computing device belonging to the user may be updated to include an indication of the personal data related to the physical location. If desired, the user can obtain additional information regarding the personal data displayed on the device by selecting an appropriate icon.

In one implementation, a computer-implemented method for generating geocoded user information is disclosed. The method comprises searching user data across multiple different data corpuses for entries having location-related information and determining locations for the location-related information. The method further comprises generating a map showing a current location of a mobile device along with representations of the entries having location-related information, at the determined locations, for entries from the multiple different data corpuses.

In some aspects, data for displaying the map is received from a remote server and data for the entries is received from a local device and overlaid on the map. Also, the method further comprises displaying, over the map, icons representing entries for events that are a determined distance from an outer edge of a geography displayed by the map. In addition, determining locations for the location-related information comprises transmitting descriptive location-based data to a remote server and receiving in response geocoded information. In certain aspects, the method further comprises submitting a query associated with the user data to a remote local search engine and displaying icons representative of data received in response to the query along the representations of the entries.

In another implementation, a tangible medium having recorded and stored thereon instructions that, when executed, performs actions is disclosed. The actions include searching user data across multiple different data corpuses for entries having location-related information and determining locations for the location-related information. The actions also include generating a map showing a current location of a mobile device along with descriptions of the entries having location-related information, at the determined locations, for entries from the multiple different data corpuses.

In certain aspects, the instructions for generating a map further include instructions for displaying, over the map, icons representing entries that are a determined distance from an outer edge of a geography displayed by the map. The instructions also include instructions for receiving a panning action on the map, and updating a display of the map and the entries to match a new location on the map. In addition, the instructions include instructions for receiving a panning action on the map, and updating a display of the map and the entries to match a new location on the map.

The systems and techniques described here may provide one or more of the following advantages. First, a system may geocode personal information from a variety of applications, and may display the information to a user in a manner that incorporates the various types of information into a common display. Second, a system may augment an electronic display with nearby contacts and events, including by indicating entries that fall outside the current range of a visual display.

The details of one or more embodiments of geocoding personal information are set forth in the accompanying drawings and the description below. Other features and advantages of geocoding personal information will be apparent from the description and drawings, and from the claims.

DESCRIPTION OF DRAWINGS

Like reference symbols in the various drawings indicate like elements.

DETAILED DESCRIPTION

This document describes systems and techniques for generating maps that contain geocoded user information. User data is selected from one or more databases and the "real-world" location of the selected data is determined. Subsequently, the location of the selected data may be indicated by markers placed on a map displayed on a portable computing device. For example, a businesswoman may save data relating to contacts, appointments, and tasks in one or more web applications. As she drives from her office to a client site, icons representing the save data in her immediate vicinity may be displayed on the screen of her PDA. If she selects a contact or event by, for example, touching the area of screen where the marker resides, detailed information regarding the contact or event may be displayed, such as a description of an appointment or a telephone number associated with a contact or an appointment. The user may then, for example, click to call the telephone number, either by pressing on it or selecting it using voice commands.

Figure 1:
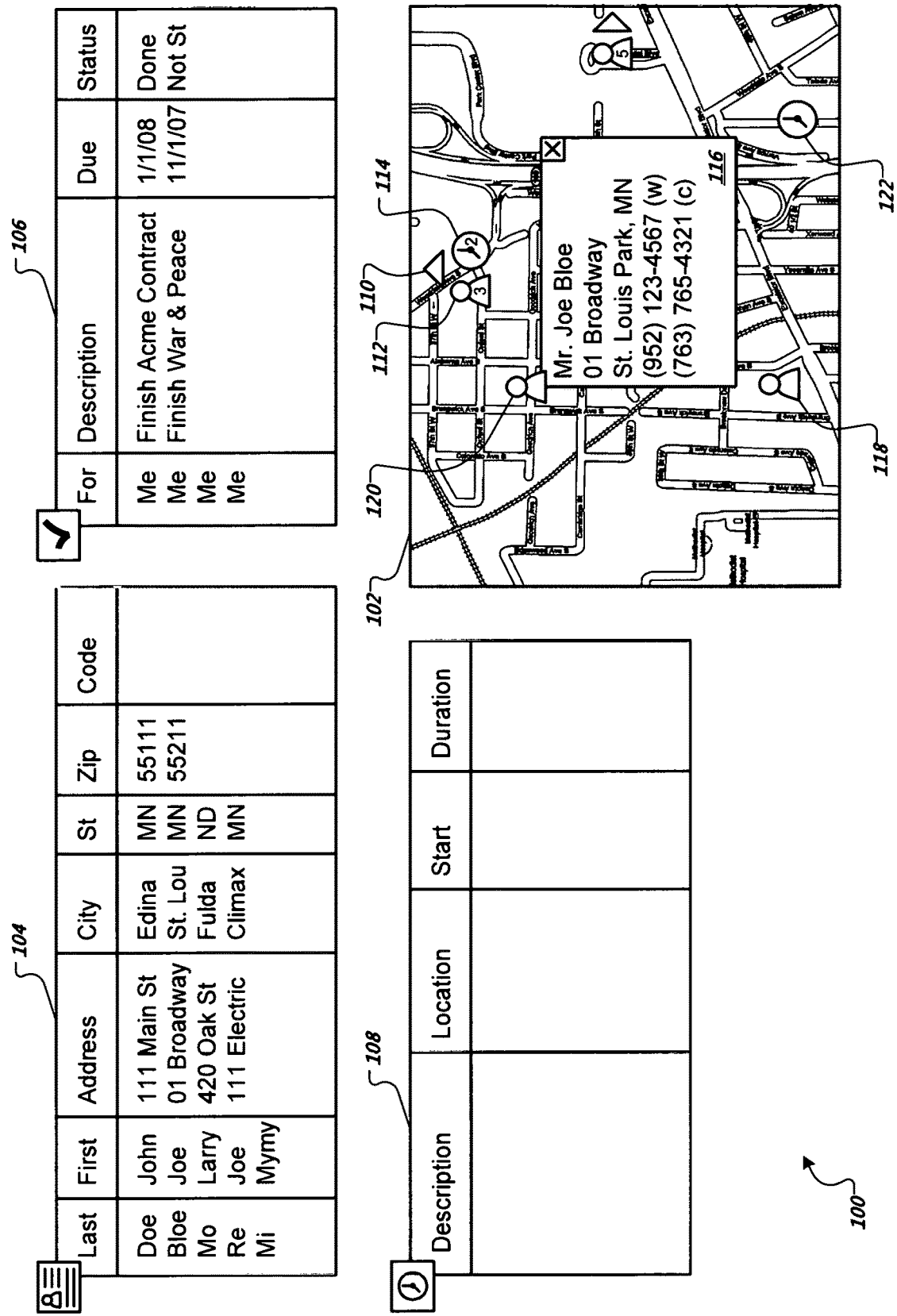
FIG. 1 illustrates a conceptual diagram of an exemplary mapping system that can display geocoded user information.

FIG. 1 illustrates a conceptual diagram 100 of an exemplary mapping system that can display geocoded user information. In general, the system may extract user data from a database that contains a number of data corpuses, geocode the extracted information, and display the geocoded information on a map generated by the system. In an illustrative example, the exemplary mapping system may extract information from web applications and determine the physical location of the extracted information, i.e., geocode or geo-locate the information. As the user travels, the mapping system can generate a map that includes markers placed at locations on the map corresponding to the individual physical locations of the extracted information.

For example, a user may enter personal information into web applications such as an online calendar or appointment book, "to-do" or task list, address or contacts book, etc., using a computing device. The personal information may include the addresses of family and friends, errands that need to be completed, or upcoming work and social events, among other data. As the user moves from one place to another, the information contained in the online applications may be used to populate a map display on a computing device traveling with the user such as a PDA, laptop, in-vehicle navigation system, or other appropriate computing device. In some cases, the personal information may be used to enhance other types of output. For example, the personal information contained in the online applications may be used to trigger a voice reminder or to make a computing device vibrate when a user approaches a location corresponding to the personal information.

Referring more specifically to FIG. 1, image 102 is a screenshot of the display produced by an exemplary mapping system capable of displaying geocoded user information. In an illustrative example, the geocoded information may be represented by event 122 and contact 118 markers or icons. In some implementations, the markers 118, 122 may be associated with user data contained in web applications and on-line data repositories. For example, the user data may reside in one or more web applications such as GOOGLE CALENDAR, GOOGLE MAPS, GOOGLE DOCS, or other appropriate web-based programs. In other implementations, each marker 118, 122 may correspond to information contained in a computing device such as a PDA, personal computer, laptop, cellular telephone, or the like, or information that is stored on a mobile device and is synchronized with databases at a central server system.

In an illustrative example, a user's information may be stored in one or more applications that may include a calendar 108, address book 104, and task list 106, among other appropriate data management applications. An event marker 122 may represent, for example, an upcoming doctor's appointment scheduled in the calendar 108, while the contact marker 118 may symbolize a co-worker listed in the address book 104. The location of both the event 122 and contact 118 markers on the map may be determined by the geospatial location of the event or contact represented by the markers 118, 122. In the example described above, the placement of the event 122 and contact 118 markers may correspond to the actual location of the doctor's office and the contact's home, respectively.

The location for an event or contact may be determined by geocoding textual information from an application. For example, a contact entry may include an address such as "01 Broadway, St. Louis Park, Minn." in an address field, and an application can check that address field and then geocode such information, such as by submitting the textual information to a server programmed to respond with geocoded information such as a lat/long pair or other properly formatted geocoded information. In a like manner, a filter may review the descriptions of appointments looking for explicit address information such as street names or more implicit address information such as the name of a restaurant (e.g., "lunch at Spago").

Such translation of textual address information may occur, for example, by a first service scraping a user's databases for such information, and a second service translating the textual information into geocoded information. The translation may also take into account various contextual factors. For example, for appointments occurring around the lunch or dinner hours, the term "restaurant" may be added to a search query. In a like manner, a search may first be conducted on a database containing listings of businesses, and may be performed as a local search in an area that is currently around the user's mobile device.

In other implementations, the event markers 122 may correspond to places other than particular listed locations in a user database. For example, an event marker 122 may relate to an uncompleted task in the task list 106. In an illustrative implementation, the system may parse pending tasks in the task list 106 and select one or more keywords or phrases, such as "grocery," "mail," and "dry clean." Subsequently, the system may generate synonyms for the keywords—in the current example, the map system might produce "supermarket," "post office," and "laundry," respectively, for the selected keywords—and search reference map data for entities that match either a selected keyword or a keyword's synonym and that are within a predefined radius of the user's current location. The system may then retrieve this data. Using the street address or other information related to the matching entities, the map system may populate the map with event markers 122 that correspond to the actual location of the matching entities. In the current example, as the user travels along a city street, the map system may place event markers 122 on the map that correspond to a number of local grocers, a United States Post Office, and a dry cleaner within a certain distance of the user.

The system may perform a similar process for scheduled calendar events that lack specific location-related information. In some instances, a user may enter a calendar event with a location too general to be geocoded or without including a location at all; e.g, "See movie Thursday, Nov. 1, 2007 at 8:00 pm." By following the procedure described above (parse entry, generate synonyms, and search) the system may locate movie theaters in the user's vicinity and may include corresponding event markers 122 on the map.

To facilitate user understanding of the spatial relationships between the user's location and the location represented by a map marker 118, 122, the system may employ a color or transparency scheme for certain markers. In some circumstances, it may be difficult for a user to determine the relative distance between the user and an event or contact represented by a map marker 118, 122. For example, the user may have trouble appreciating the scale of the map displayed by the map system when the user is also driving a motor vehicle. In other words, the user may be unable to judge whether the displayed markers 118, 122 are two or twenty miles away from the user. In some implementations, markers 118, 122 within a preset distance of the user may be displayed in a different color than other markers. For example, markers within the preset distance may be red, while all other markers are blue; however, other color schemes may be used. In a similar manner, the size of markers may change as they get closer to the current location of the user's mobile device In other implementations, a marker 118, 122 may begin to fade in or out as the user moves toward or away from a marker 118, 122. For example, as the user travels home from work, a marker 118 representing the office may fade (i.e., become more transparent) as the user moves outside a predetermined area. Similarly, a marker 118 representing the user's home may become more opaque when the user nears his or her home. In certain implementations, the color and transparency scheme may be combined. For example, map markers 118, 122 outside the user's surrounding area may become blue and fade as the user travels away from their physical location; nearby markers 118, 122 may turn red and become less transparent as the user approaches a marker's actual location.

In some implementations, the markers 118, 122 may be images that are associated with the contact or event. For example, the contacts may be represented by an image of the person whose contact information is contained in one of the web applications, while events can be represented by pictures of the location where the event is being held. In other implementations, contacts and events may be divided into broad categories such as co-workers, family, friends, work, home, gym, etc. Each category may be associated with a different image; contacts and events that fall within a given category may be represented by an associated image on the map display. Also, the markers, as shown, may simply differ based on the corpus for which the relevant information was retrieved, e.g., contact, appointment, or task list.

The off-screen markers 112, 114 can represent contact 118 and event 122 markers that will be shown in an area of the map adjacent to the currently displayed map section. In some implementations, the section of the map displayed by the mapping system may not contain all of the user's geocoded information. For example, the system may generate a map of an area within a five mile radius of the user; any event 122 or contact 118 marker outside that area may not appear on the screen. In some implementations, off-screen markers 118, 122 may be placed on the edge of the map display below or to the side of a direction arrow 110 representing the direction of the off-screen contacts or events. Each off-screen marker 112, 114 may contain a numeral indicating the number of non-displayed events or contacts, respectively, that may be displayed in the subsequent map section. If no off-screen markers are displayed, the direction arrow 110 may represent the direction that the user is currently traveling.

Details associated with a contact or event may be displayed in an information window 116 linked to a contact 118 or event 122 marker. The information window 116 may be adjacent to a marker 120 or, in some implementations, may be situated near its associated marker in a non-contiguous manner. Details may be extracted from information stored in one or more web applications or other appropriate sources. For example, if the marker 118, 122 represents a contact, the details displayed in the information window 116 may include the contact's name, address, phone number, etc.

The markers shown on display 102 can also be filtered in a familiar manner. In particular, buttons may be shown on the display 102 that when selected may causes certain classes of markers (e.g., task list, contact, or appoint) to appear or disappear. Such interactivity may approximate the manner in which users can currently add layers (e.g., for street names, geocoded photos, and the like) to applications such as GOOGLE MAPS. In such a manner, a user may be provided with the ability to personalize their display and to prevent it from becoming cluttered with information that is not presently relevant to the user.

Also, certain user information may be automatically filtered. For example, markers may be shown only for appointment data relating to appointments that will occur in the near future (i.e., the current day). In a like manner, markers for contacts may be limited only to close friends or family members. The contact information may also be extracted from a social networking application, and the markers may be limited only to social contacts of a first degree or by a similar limiting factor.

In some cases, a device may monitor its location and alert a user when a place of interest is nearby. For example, when a user approaches a relevant location (e.g., a home or business) the device may initiate an auditory (e.g., a voice reminder) or tactile (e.g., vibration) indicator to notify the user that the place of interest is close. In some cases, these alerts may be triggered by physical, temporal, or navigational proximity to a desired location or event. For example, an alert can be triggered when a user is within 5 miles of a specified business. In some implementations, an alert may be triggered when an event is about to start. For example, a device may vibrate 15 minutes before a movie show time. In other cases, an alert may be triggered when an exit to a desired location (e.g., a grocery store) is close by. In some implementations, these auditory or tactile reminders may be in addition to (or in lieu of) alerts, reminders, or icons that may appear on a map display.

In some implementations, triggering events may be user specified. For instance, a user may set an alert based upon a weather forecast or current weather conditions, price comparisons, birthdays, surf reports, etc. In some cases, a user may combine one or more triggering events or alert indicators to form an alert. For example, a user may specify that the device should provide a verbal reminder and an appropriate map icon when a selected movie is 15 minutes from show time and a theatre showing the movie is within 10 miles.

In an alternative implementation, triggering events may be automatically generated for a user. For example, a user may opt to receive suggestions from a recommendation system such as those commonly employed by online retailers. These recommendation systems can suggest items of interest to a user by, for instance, identifying items that similar consumers have found interesting or by examining the user's purchase history, among other methodologies. The recommendation system may supply the identified suggestion to the mapping system, which can, in turn, generate an appropriate reminder (e.g., a map icon, a voice reminder, or a tactile reminder). In an illustrative example, a user may subscribe to a movie rental service that can supply movie recommendations to its subscribers. The service may generate recommendations for movies that are similar to movies the user has watched or that satisfy some other criteria. If the user chooses to receive suggestions from the service, the service may supply these recommendations to the user's mapping system. The system can then geocode the recommendations. For example, the system may generate a map icon representing the location of a movie rental store that may carry the recommended movie. Or, if the recommended movie is currently playing in theatres, the system may create map icons that represent the location of theatres showing the movie. In some implementations, the recommendation service can create the reminders and transmit them to the mapping system. Although the recommendation system in the illustrative example involved movie rentals, other recommendation systems may be used. For example, a recommendation system that suggests products or services that may be of interest to the user can be used.

Figure 2A:
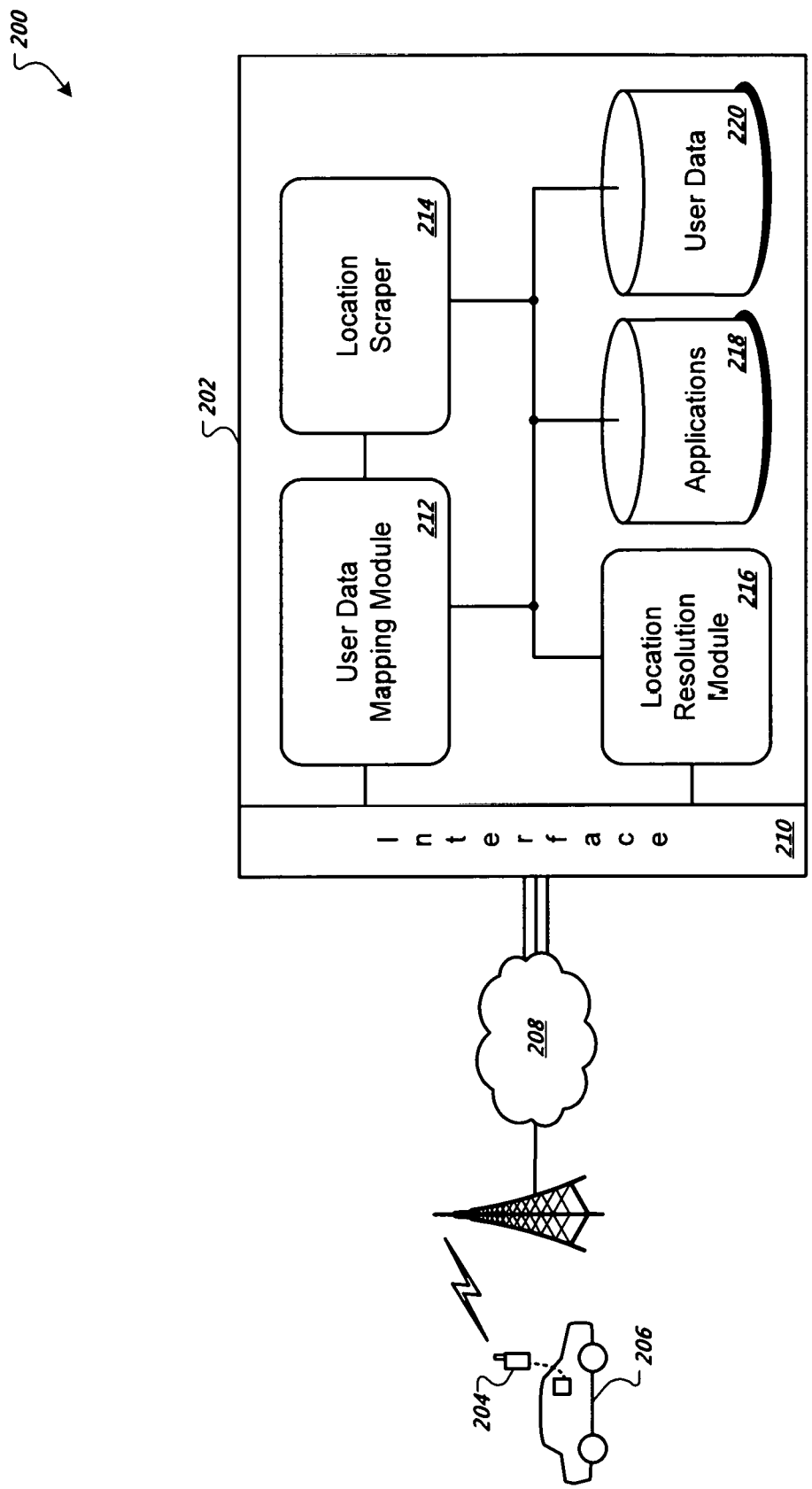
FIG. 2A is a block diagram of an exemplary mapping system capable of displaying geocoded user information.

FIG. 2A is a block diagram 200 of an exemplary mapping system capable of displaying geocoded user information. The system can include a remote computing device 204 (e.g., a laptop, PDA, smartphone, portable navigation device, etc.) associated with a vehicle 206 that may communicate with a cartography application 202 over a network 208 such as the Internet. The cartography application 202 may include user data 220, one or more applications 218, a location resolution module 216, a location scraper 214, a user data mapping module 212, and an interface 210.

In an illustrative implementation, the cartography application 202 can be implemented as a collection of web-based modules, applications, and on-line data warehouses. As discussed in reference to FIG. 1, user data 220 may include information found in a user's calendar 108, task list 106, and address book 104, among other data. Location scraper 214 can search user data 220 for location information. For example, the location scraper 214 may search predetermined user files for specific text such as place names (e.g., the White House), addresses, coordinate data, or other types of location information.

In some implementations, the location scraper 214 may be implemented as a "web crawler" that searches certain websites for text indicative of locations. For example, the location scraper 214 may search selected websites for business names, area names, addresses, etc. In some implementations, the location scraper may search for data in a specified format, e.g., 5 contiguous digits (potential zip codes), the word "Apartment" or "Apt" followed one or more numbers, city and state names, etc. In other implementations, the location scraper may search for predefined text such as "Walker Museum," "Dinkytown," or "the University of Minnesota" that is indicative of a location. In some circumstances, the location scraper 214 may request location-based information from predetermined web applications, or may search the data associated with the applications for location-based information in the manner described above.

Alternatively, instead of, or in addition to, searching user data 220 for location-based data, the user or another entity may provide the cartography application 202 with location information. In some implementations, the user may input location information directly to the cartography application 202 using a remote computing device 204. In other implementations, contacts or events may also transmit location information to the application 202. In an exemplary implementation, when the user comes close to certain contacts or events, the contact or event may send information regarding its location to the cartography application 202. For example, when the user comes within a specified distance of a store, the store's computer system may be alerted to the user's presence (e.g. the device may transmit a signal to the store) and, in response, transmit the store's address and other information (e.g., information regarding the store's current sales promotion) to the system 202. In a similar fashion, a contact may send his or her location information to the user when the user is in the vicinity of the contact.

The user may be provided control over the amount of information abut their location that is ever shared with the system or with other users. In particular, the sharing of information may be permitted only if the user takes affirmative steps to consent to such sharing, so that a default for the system is to maintain privacy over user data.

The location resolution module 216 may convert a description of a location to geodata, such as a lat/long pair. The location resolution module 216 may take a variety of familiar forms and may parse location-based descriptive information, and supply it to a resolving engine that identifies one or more unique locations that match the information. The module 216 may then apply one or more heuristic rules to the results if there is more than one result. For example, the result with the highest degree of similarity may be used, or a result closest to the user's present location may be used. For example, if the description text is "123 Smith," and there is both a Smith Street and Smith Avenue in a town, the relevant location may be selected as the street that includes a listing of a house at 123, a street that is closest to the user's mobile device at the moment, a listing that includes other contextual information that matches a location (e.g., if there is a Ditalio's Pizzeria on Smith Avenue, and an appointment also includes the term Ditalio's or pizza), or a street that matches some other parameter.

When there is a need to identify the current location of a device, the computing device 204 may transmit its location to the cartography application 202 by way of network 208. In such a situation, GPS or other technology on the device 204 may generate a location identifier in a well-known manner. When tower triangulation is used, the cartography application 202 may itself determine the location of device 204.

Where the cartography application 202 is tasked with populating a map with information about user data, the cartography application 202 may determine if any reference map data corresponds to the location of the device 204. For example, the device 204 may transmit the latitude and longitude of its current location to the cartography application 202 through suitable communication means. After the cartography application 202 has received the data, the cartography application 202 may search for a location in the reference map data that corresponds to the data provided.

User data mapping module 212 may generate a map of the user's current location that includes geocoded user information. The map may be generated in a variety of manners, such as in the manner provided by GOOGLE MAPS. For example, a zoom level for a map may be determined, and a number of map tiles around the user's location, at that zoom level may be fetched and transmitted to the device 204 for display to the user.

In some implementations, the user data mapping module 212 then determines the physical location of data collected by the location scraper 214. For example, the location scraper 214 may provide the user data mapping module 212 with a street address or lat/long information (e.g., as generated by the location resolution module 216) for each relevant event that has been scraped. Subsequently, the user data mapping module 212 may locate the address in reference map data and select an appropriate marker to associate with the located map data. Finally, the mapping module 212 may create and populate a map display with a marker representing the user's location.

Interface 210 may interpret incoming data and package outgoing data for reception by device 204. In some implementations, upon receiving location-based data from the computing device 204, interface 210 provides the data to the user data mapping module 212. The user data mapping module 212 may, if necessary, use the location resolution module 216 to convert the data into a format suitable for use by the cartography application 202, e.g., coordinate data. As discussed above, the user data mapping module 212 may then determine the location of the device 204 in its reference map data by searching the data for entries having positions that match the location on the map to be currently displayed.

Once the mapping module 212 has retrieved the relevant reference map data, information obtained by the location scraper 214 is used by the mapping module 212 to determine the placement of geocoded markers in the retrieved map data. In some implementations, the user data mapping module 212 determines the physical location of data collected by the location scraper 214. For example, the location scraper 214 may provide the user data mapping module 212 with a street address. Subsequently, the user data mapping module 212 may generate a marker for the address such as by passing the data to the location resolution module 216. Other data types may require different processing techniques. In some implementations, key words or phrases located by the location scraper 214 may be compared with a list of common location names and their associated coordinates to determine a corresponding position in the reference map data. For example, the word "Metrodome" may be compared with a list of popular locations in the reference map data. If a matching location name is found—in this example, the matching name may be "Hubert H. Humphrey Metrodome"—the coordinate data associated with the matching name may be flagged and later a marker representing the location can be displayed on the map in a location corresponding to the physical location of the Metrodome. In an alternative implementation, the location scraper 214 may, in a similar manner, determine the location in the reference map data that corresponds to the information extracted from user data 220.

Figure 2B:
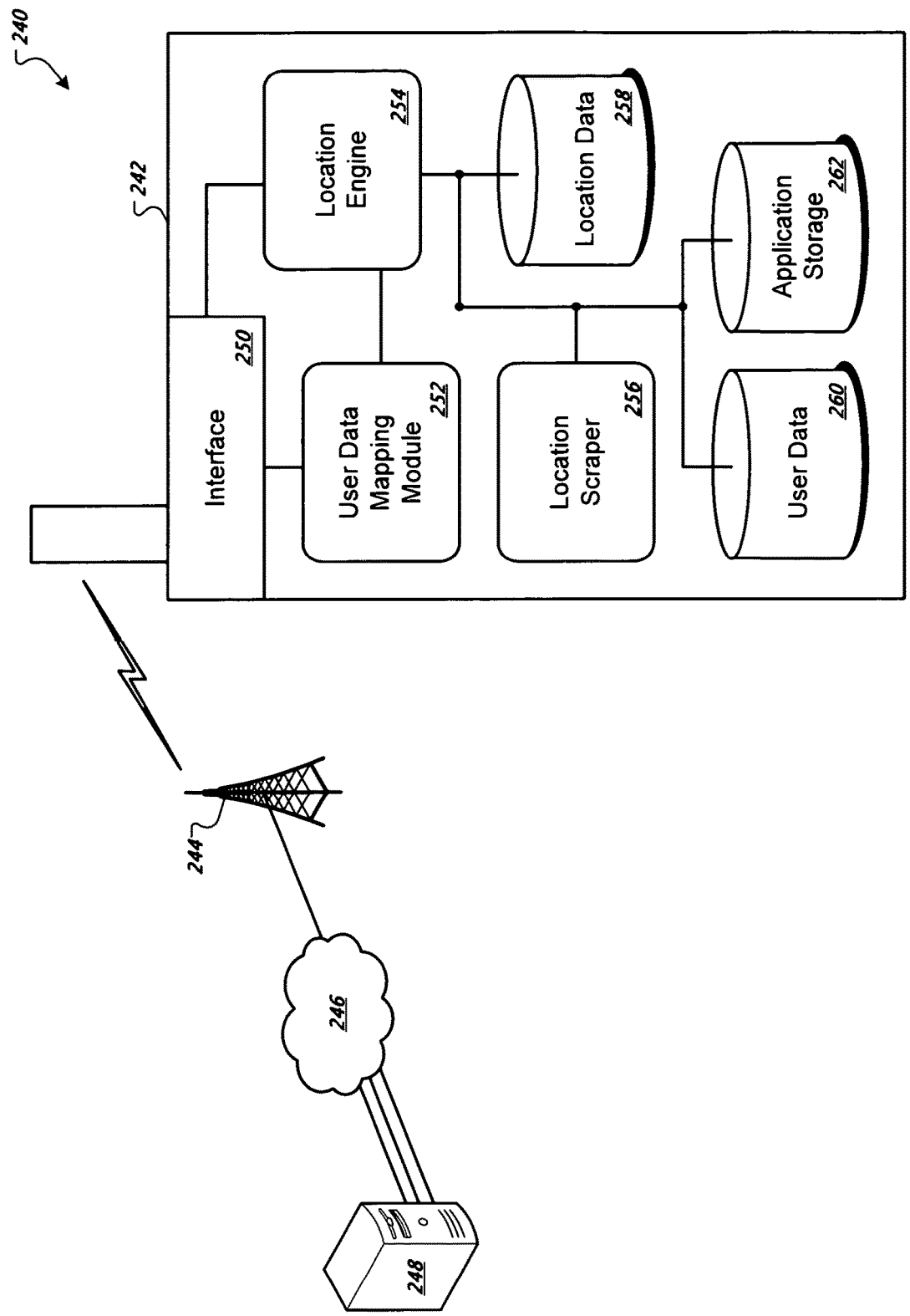
FIG. 2B illustrates an alternative implementation of a mapping system capable of displaying geocoded user information.

FIG. 2B illustrates an alternative implementation of a mapping system 240 capable of displaying geocoded information. In this example, more of the mapping functionality is performed on a mobile device, as opposed to FIG. 2A where most of the functionality was performed on a central server. These two systems are provided as examples only, and other arrangements may also be employed.

Referring to FIG. 2B, mapping system 240 may include a computing device 242, remote computing device 248, network 246, and a base station 244. The computing device 242 may include application storage 262, user data 260, location scraper 256, location-based data storage 258, user data mapping module 252, location engine 254, and interface 250. Application storage 262 can contain applications and their associated data. As noted above, such applications may include a calendar, task list, address book, and the like. User data 260 may include user information such as contacts, tasks, event information, etc.

As described above in reference to FIG. 2A, location scraper 256 may search user data 260 (and, in some implementations, application storage 262 as well) for location information; the location scraper 256 may then store the location information in location-based data storage 258. In this example, the location scraper 256 analyzes files stored on a computing device 242, which is a mobile device such as a smartphone.

Location engine 254 may determine the computing device's 242 current location and may also convert location descriptions (e.g., addresses) to a location identifier (e.g., a lat/long coordinate). The location engine 254 may make such conversions itself, or may pass a location descriptor to a remote server such as server 248 and receive a location identifier in response. In some implementations, the location engine 254 may calculate the computing device's 242 position by accessing a GPS receiver in the device 242. In other implementations, the location engine 254 may estimate the device's 242 position using the location of base stations 244 or by employing other appropriate techniques. The location engine 254 may supply location information to the user data mapping module 252 discussed below, or it may store the device's location in location-based data storage 258.

In some implementations, the location engine 254 may also process location-based data stored in location-based data storage 258. In some implementations, the location engine 254 may search reference map data for map entities that correspond to location-based data contained in location-based data storage 258. For instance, the location engine 254 may search map data for entities related to a keyword (e.g., "Mount Rushmore"), coordinate data, street addresses, location names, or other such information found in location-based data storage 258. Once the location engine 254 finds a corresponding entity, it may send the coordinates of the entity to the user data mapping module 252.

In certain implementations, the user data mapping module 252 can create a map of the user's current location that includes geocoded user information (e.g., for the user's current location and for events associated with a user). The mapping module 252 may be invoked when the user selects an icon on a display of device 242 in order to launch a navigation application on the device 242. The location-based data may also have previously been provided to the location engine 254 for conversion from a textual representation of a facility or topic (e.g., "Tony's Pizza" or "milk") or of an address (e.g., "123 Main St., Anytown, Calif.") to a location identifier such as a lat/long coordinate pair. In such a situation, the coordinate pair may have been stored in the location-based data 258, and the mapping module 252 may access such data directly.

The mapping module 252 may request the current location of the device and any location-based data collected by the location scraper 256 for the location engine 254. When the mapping module 252 receives the location-based data, the mapping module 252 can provide the information to a graphical user interface on the device 242 for display on the device, in a manner like that shown in FIG. 1. For example, after the mapping module 252 receives the device's 242 current location, it may transmit that location to server 248 in order to have map tiles for the appropriate area returned to it, and may determine what location-based data extracted by the location scraper 256 is in the vicinity of the of the device 242, and load that location-based data from memory (e.g., from user storage 260).

In some cases, the functionality described above in regards to FIGS. 2A and 2B may be split between computing devices. For example, a remote computing device such as a PDA, laptop, or portable navigation device may include, among other things, applications and user data. A cartography application stored, for example, on a remote server may include a location scraper, a location resolution module, and a user data mapping module, among other components. In this implementation, the remote computing device may transmit user and application data to the cartography application, which, in turn, can generate a map that may include geocoded user information. In other implementations, a remote computing device may contain a cartography application that can include, for example, a location scraper, location resolution module, and a user data mapping module, while a remote server can contain, inter alia, applications and user data. In this implementation, a remote computing device may generate a geocoded map using application and user data supplied by a remote server.

Figure 3A:
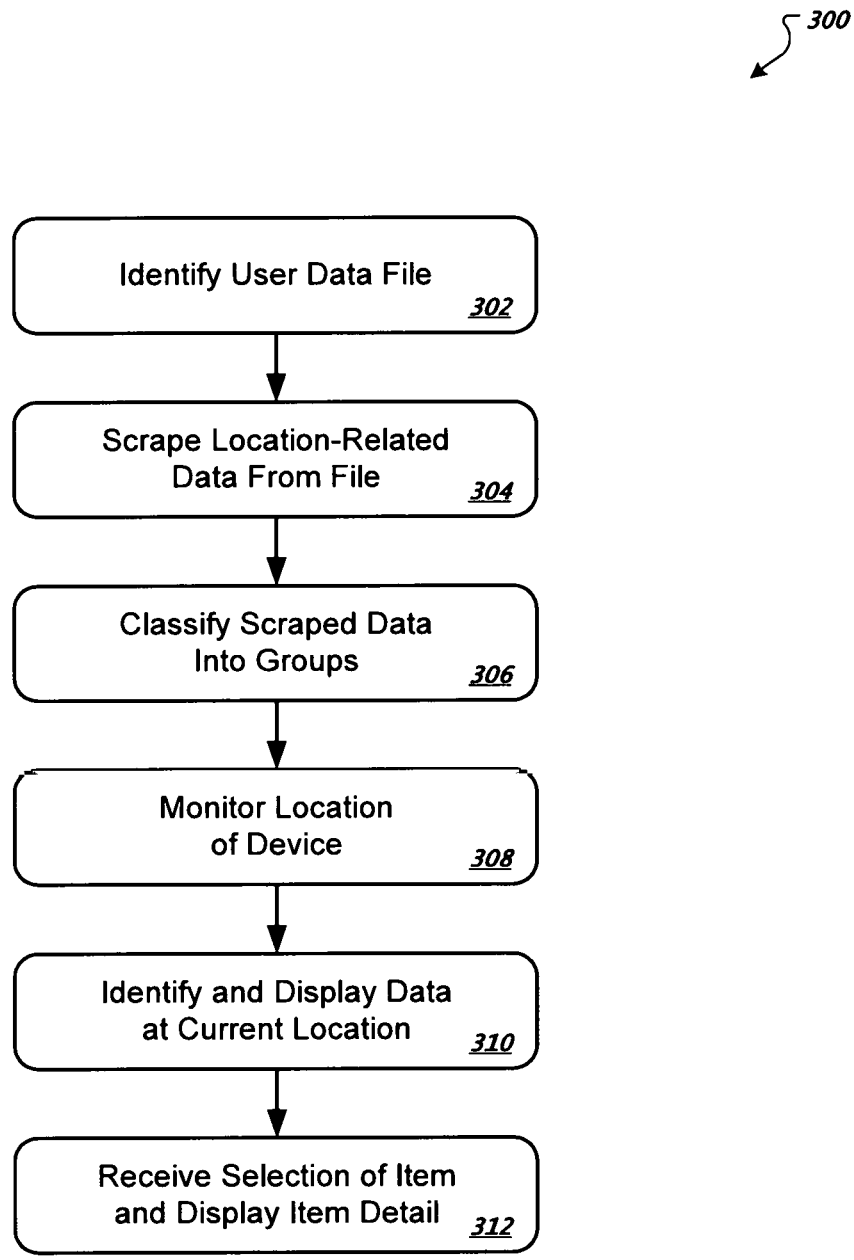
FIG. 3A shows a flowchart illustrating an exemplary process for creating a map that includes geocoded user information.
Figure 3B:
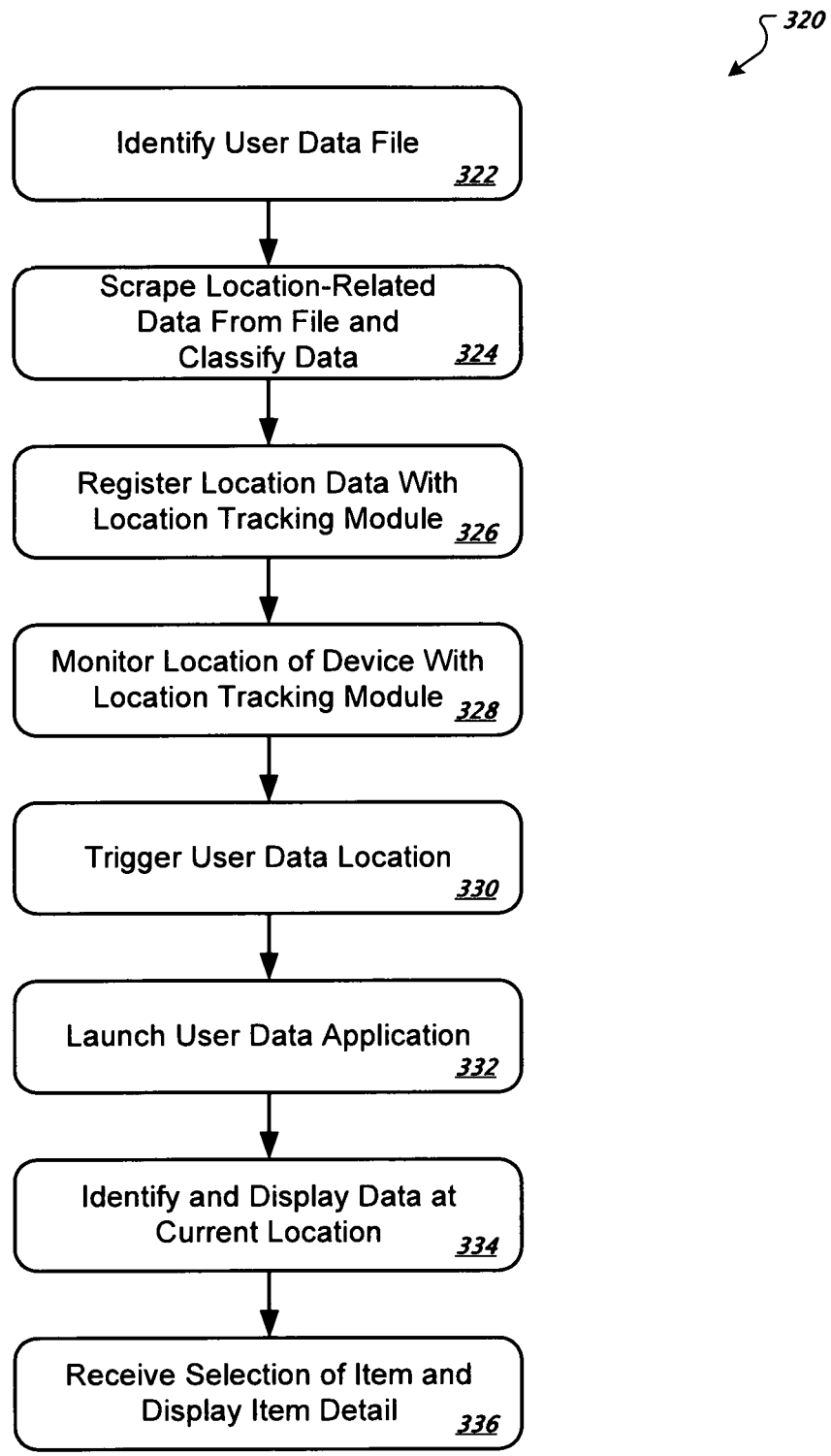
FIG. 3B, shows a flowchart illustrating an alternative exemplary method for creating a map that includes geocoded user information.

FIGS. 3A and 3B are flow charts of example processes 300, 320 for generating a map that includes geocoded user information. The process 300 may be performed, for example, by a system such as the systems 200 and 240 and, for clarity of presentation, the description that follows uses the systems 200 and 240 and the conceptual diagram 100 as the basis of an example for describing the processes. However, another system, or combination of systems, may be used to perform the processes 300, 320. In general, the process 300 of FIG. 3A involves identifying location-based data for a user and tracking the user's location with an application that then displays the data over a map around the user's location. FIG. 3B involves a similar process 320, but the tracking of the user's location is performed by a special purpose location tracking module that then reports events that may be relevant to the application, back to the application so that the application may update its display to the user.

Referring to FIG. 3A, a flowchart illustrates an exemplary process 300 for creating a map that includes geocoded user information. At step 302, a user data file is identified. In some implementations, a location scraper 214 can search user data 220 for user files that are likely to contain location-based data. In some implementations, the location scraper 214 may search files that have specified file extensions, files that are located at a specified location (e.g., at a particular web address), or a user may designate target files for the location scraper 214 to search. In some implementations, a web application may be designated by, for example, the application's web address.

Where the data is stored on a server, the location scraper 214 may request that the web application send data files that may contain user information. Under some circumstances, the location scraper 214 may request a predetermined data file; in others, the data file may be dynamically generated by the web application. In other situations, the location scraper 214 may "crawl" the application's website and associated data storage and extract location-based data. For example, as discussed earlier, the location scraper 214 may access an application website and associated data storage for text or other data containing location information such as coordinate data, addresses, etc.

The method proceeds to step 304 where location-related data is scraped from the file. In certain implementations, the location scraper 214 may search user data files for location-based data. For instance, the location scraper 214 may search and parse the user data files for street addresses, road and intersection names, coordinate data (e.g., latitudes and longitudes), and location names (e.g., businesses, cities, towns, states, etc.). In addition, the location scraper 214 may search the data for key words (e.g., hotel, mall, shoe repair, etc.), key phrases (e.g., hotel near LaGuardia), geographic features (e.g., Dinkydome), and driving directions (e.g., from Chicago to Minneapolis). Such extraction may occur according to any of a variety of well-known mechanisms. The extraction in this example occurs across multiple corpuses of data, such as contacts, task lists, and appointments.

After location-related data is scraped from the file or files, the scraped data is classified into groups at step 306. In some circumstances, the location scraper 214 may sort the location-related data into different categories based upon data type. For example, the data may be sorted into the following categories: street addresses, road and intersection names, coordinate data, location names, key words, key phrases, geographic features and driving directions. In an alternative implementation, the data may be classified by the amount of processing that may be required before the data can be mapped. Data that may not require manipulation before it can be used by the user data mapping module 212 (e.g., coordinate data) can be separated from data that may need processing by the mapping module 212, e.g., key words and key phrases.

The data may then be submitted for conversion to a geocoded version of the data. For example, a mobile device may submit the scraped location-related information to a geocoding server, which may return coordinate data for a location or locations that correspond to the location-related information. Where the information has been previously classified according to the amount of processing needed to map the data, certain of the data may be geocoded locally where such geocoding is relative simple, and other information may be submitted to a remote server for geocoding.

The process 300 may also further classify data into groups based on the type of event represented by the data, such as based on the corpus from which the data was obtained. As one example, all appointments may be placed in one group or may be flagged in a particular manner, while all contacts are placed in another group. Such grouping may assist in the subsequent display of the events, such as when different icons are to be used in the display of different forms of events.

After the data is classified into groups at step 306, the location of the computing device 204 is monitored at step 308. For example, a mapping application may substantially continuously receive information from a GPS module on the device 204 or otherwise receive updated location information for the device 204 as the device travels around a geography.

Subsequently, data at the current location is identified and displayed at step 310. For example, the process 300 may identify a location for device 204 and a zoom level for a map around the device 204. Such information may be used to identify a bounding box that is the same size as the map to be displayed or is larger than the map (e.g., when events that fall off the edges of the map are to be indicated). The process 300 may search for all identified events (e.g., contacts, appointments, etc.), which may be stored in a table where one column of the table is a geocoded location of the events, and identify all events inside the computed bounding box. In addition, a query may be submitted to a remote server to find additional items in the appropriate area, such as any grocery stores near the device 204 where one of the user's events is a task to pick up milk and bread. Search results for such a query may be added to the data that is identified and displayed as an overlay on a map.

In some implementations, the computing device's 204 location may be transmitted to the user data mapping module 212 for generation of the appropriate mapping data. Using the location-related data, the user data mapping module 212 may create a map of the user's current location. For example, the longitude and latitude of the device's 204 current location may be transmitted to the user data mapping module 212. After receiving the location-based data, the mapping module 212 may find a location in its reference map data that corresponds to the coordinates provided by the resolution module 216, or may submit the location to a remote server for resolution of the location into mapping data for that location. When the device's location in the reference map data has been found, the mapping module 212 may load all map data points (e.g., map tiles at the appropriate zoom level) within a specified radius (e.g., 5 miles) or bounding box from memory or may mark the data for later processing.

Next, the mapping module 212 may use location-based data supplied by the location scraper 214 to determine what user information, if any, should be displayed over a map of the user's current location created by the mapping module 212. In some implementations, the location scraper 214 may send the location-related data extracted from user data 220 to the mapping module 212, along with geocoded data for the location-related data.

Once the location-related data has been received, the mapping module 212 may find one or more locations in its reference map data that corresponds to the location-based data supplied the location scraper 214. For instance, the mapping module 212 may initially define the boundaries of the map it will create; e.g., the mapping module 212 may only display map data within a five mile radius of the user's current location, or data inside a certain bounding box. Next, the mapping module 212 may ascertain if certain location-based data provided by the location scraper 214 falls within the map boundary. In some implementations, the mapping module 212 may first determine whether location-based data from the location scraper 214 that may not need further processing (e.g., coordinate data) is outside the map boundary; if so, that location-based data is excluded from the map. Then the mapping module 212 may compare location-based data that may require additional manipulation (e.g., key words or phrases) with the map boundary; as noted above, location-based data that falls outside the map boundary will not be included in the map. For example, the location scraper 214 may provide the mapping module 212 with the keyword "hotel." The mapping module 212 may generate synonyms for "hotel" (e.g., "inn" or "lodge") and search its reference map data for locations that contain one or more of those words. The coordinates of map data (if any) that contain either a keyword or one of its synonyms may be compared with the previously generated map boundary and coordinate data falling outside the boundary may be excluded from the map. Generally, however, such ambiguous location-related data will be geocoded or otherwise processed initially so that it can be tracked for inclusion inside a currently active window showing a map as a user moves.

When the position in the reference map data of both the user's device and relevant user data have been determined, the mapping module 212 may provide the data for generation of a map on a mobile computing device such as device 204. Such provision may occur locally where the data is assembled on the device 204 itself, or may occur as a transmission of data over a network such as the Internet, from a server providing mapping services, to a user of a computing device 204.

Once data at the current location has been identified and displayed, the method advances to step 312. At step 312, selection of an item (e.g., an event 122 or contact 118 marker) is received from a user and item detail is displayed. In certain implementations, when the user desires information regarding a marker 118, 122 the user may select the marker and, in response, the mapping module 212 may display the desired information in an information window 116. For example, a user may select an icon showing a photo of one of the user's friends—where the icon is displayed over an address in the friend's contact file—and detailed contact information for the friend may be shown in a pop-up box.

In some implementations, an information window 116 may be displayed automatically when the user comes within a predetermined distance of an event or contact. For example, appointments in the very near future may be rare enough and important enough that they will display with a full information window 116, under the assumption that a user will be immediately interested in such information. Alternatively, the information window 116 may be displayed in response to user interaction with the mapping system, e.g., a keyboard stroke, stylus or finger tap, or other appropriate input (e.g., voice). When displayed, the information window 116 may also be partially transparent as not to obscure the underlying map.

In certain implementations, an information window 116 can display information contained in user data 220 that may be linked to a contact or other event. For example, an information window 116 for a contact may contain a contact's name, address, and home and work telephone numbers, among other data culled from user data 220. In some implementations, information gathered by the map system may be used in addition to, or in lieu of, information contained in user data 220. For example, the map system may input the name of the contact or event into a search engine and may display the search results, or a summary of the results, in the information window 116. Likewise, where an event is "milk" or a similar keyword, the location-related information may be obtained in response to a local search query of "milk" or "grocery store" in an area around a device 204, and particular detail information from the search result (e.g., address and telephone information for a business) may be displayed in an information window 116.

In an alternative implementation, the information window 116 may also display data related to the user's relationship with the contact or event. For example, the system 200, using the device's current location and speed (which may be provided by apparatus such as a GPS receiver and accelerometer within the device), may calculate the user's estimated time of arrival at the location associated with a selected marker 118, 122. Once calculated, the map system may display the estimated time of arrival in the information window 116.

The mapping module 212 (or, in other implementations, the computing device 204) may place the information window 116 on the map in such a manner as to increase the number of markers 118, 122 that are visible on the map. In some implementations, the information window 116 may be contiguous to the window's 116 associated event 122 or contact 118 marker as illustrated by contact marker's 120 information widow 116; however, in some circumstances, if the window 116 abuts its associated marker 118, 120, the window 116 will block numerous other markers 118, 122 from view. To maximize the number of markers 118, 122 visible on the screen, the mapping system may place the information window 116 in area of the display that does not include any markers 118, 122, or includes the smallest number of markers 118, 122. Alternatively, the system 200 may reduce the size of the window 116 to a predetermined minimum window size to reduce the number of markers 118, 122 that the window 116 overlays. The system 200 may also place the window 116 over an area away from the device's direction of travel so that area in front of the user are not obscured on a map.

In some instances, an information window 116 may display real-time information related to an event or contact. For example, an event marker 122 can represent an event that may be routinely subject to delays or cancellations, such as a flight or train departure. The system 200 may, in certain implementations, query a data repository related to the event and display the event's status in the information window 116. In an illustrative example, as a user is driving to the airport, the mapping system may periodically check the airline's website for updated status information and include that information (e.g., currently scheduled boarding or departure time) in the information window 116.

Referring to FIG. 3B, a flowchart illustrates an alternative exemplary method 320 for creating a map that includes geocoded user information. In general, this method is similar to method 300 in FIG. 3A but uses a dedicated location tracking module to monitor location information for a device. Such a module may be a module separate from the mapping application, which may be in the form of a service supplied by an operating system on a device. Various applications may register location-based data with the module, such as the locations or bounding boxes of objects that the applications want to track. The tracking module may store a list of such objects and their locations, along with an indicator of the application that registered the object. The module may then constantly receive location information, such as form a GPS module, and compare that information to location information for stored objects. When there is a locational overlap, the module may alert the appropriate application and may pass to the application the current location for a device.

In this manner, a single module can manage tracking of location for multiple applications. The multiple applications do not each need to request information from a GPS module, and thus may lower the processing overhead on the system and the power required to track location. At the same time, each application may register its needs and may thus be notified and may react whenever necessary, but only when necessary. In this manner, efficient management of location-related alerts and tasks may occur.

Referring now to the method 320, steps 322 and 324 (identifying user data files and scraping location-based data from the files, respectively) are the same as steps 302 and 304 in FIG. 3A, thus the above description of steps 302 and 304 are equally applicable to steps 322 and 324 and will not be repeated here. At step 326, location-based data is registered with a location tracking module. For example, certain data in the reference map data may be marked, i.e., registered, to indicate the position of location-related data. In some implementations, the location tracking module may be part of the location resolution module 216; in others, the location tracking module may be part of the location engine 254 or another appropriate hardware device or software application. In addition, the registered location-based data may include "hot spots," i.e. map segments that, in response to a user entering a corresponding physical location, prompt the display of geocoded user information. For example, when the user's location corresponds to an area inside a "hot spot" in the mapping module's 212 reference map data, the mapping module 212 may populate the map of the user's current location with geocoded user information.

After location-based data is registered with the location tracking module, the location of the device is monitored at step 328. In some implementations, the location tracking module may periodically request location information from the computing device 204. In an alternative implementation, the location tracking module may calculate the location of the device using GPS technology or through trilateration using the location of base towers 244.

At step 330, the user data location is triggered. For example, the user may enter a "hot spot" and, in response, the mapping system may set a flag or other indicator noting that the next map display that is generated may include geocoded user information. Such triggering may occur by the location tracking module checking a list of register locations each time it receives new information about the location of a device. A list of registered locations may be sorted by the location tracking module so that locations that are currently closest to a device's current location are placed at the top of the list. In this manner, the most relevant locations may be made readily available to the module.

In response to triggering the user data location, the system 200 may launch a user data application at step 332 or otherwise make the application active. In some implementations, the user data application may gather reference map data that includes the user's current location. For example, the mapping system may launch the user data mapping module 212, which, in some implementations, may request the device's 204 current location from the appropriate entity and, once the location is received, load from memory reference data within a preset radius of the current location. Thus, for example, a mapping application may lay dormant as long as the user does not come near anything that is relevant to the mapping application, but the application may be triggered automatically and displayed to the user automatically when a relevant event enters their area.

Finally, at steps 334 and 336, data at the current location is identified and displayed and, in response to item selection, details regarding that item are displayed. The reader is referred to the discussion of steps 310 and 312 of FIG. 3A for an exemplary method of performing steps 334 and 336.

Also, although the location for a map is indicated here as depending on data for the current location of a device, other location-based data may also be used. For example, a user may enter a location as a query, and the map displayed may be a map around that area. Thus, for example, a user may be planning a business trip to an area, and may enter a zip code for the area into her computing device. She may then be shown a map of the area, along with icons for her various contacts in the area automatically overlaid on the map. She may zoom and pan on the map in various familiar manners also, independent of her current location.

Figure 4A:
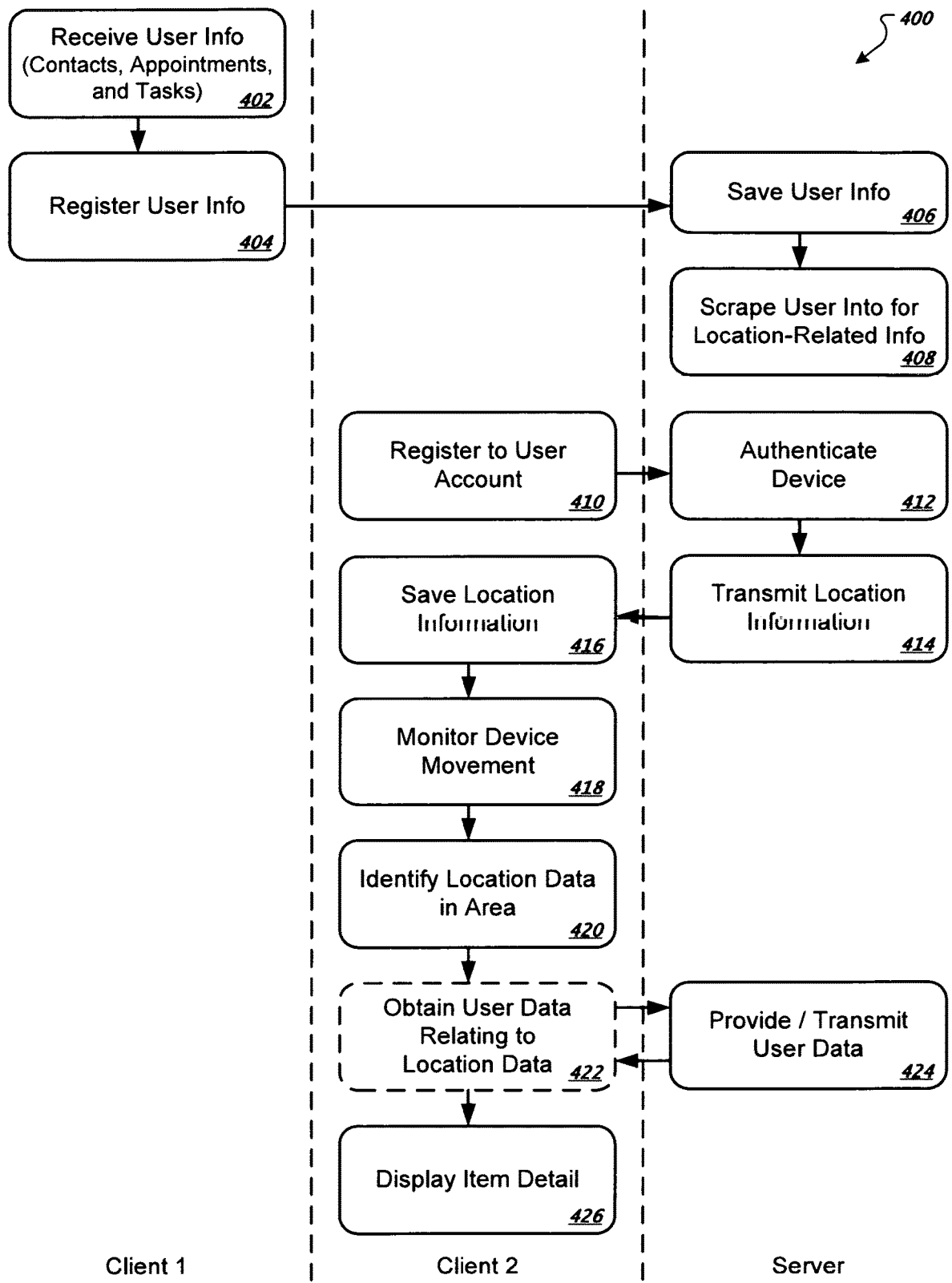
FIG. 4A illustrates an exemplary method for creating a map that includes geocoded user information in a client-server environment.

FIG. 4A illustrates an exemplary method for creating a map that includes geocoded user information in a client-server environment. The client-server environment may consist of multiple severs and clients. In certain implementations, one client may be a personal computer, laptop, or similar computing device where a user may enter user information that is later stored on a server. The server may include one or more web programs and online data storehouses that may process and store user information. A second client may perform additional processing and display a map that contains geocoded user information. For example, the second client may be a PDA, a navigation system, or other portable computing device containing location-tracking hardware and/or software and that is capable of communicating with other clients and servers.

The method begins at step 402 where user information is received. In some implementations, the user may input contacts, appointments, and tasks into a web application. For example, a user may enter appointments into an online calendar program such as GOOGLE CALENDAR or other appropriate program. In an alternative implementation, user information may be entered into a computing device such as a PDA, laptop, navigation system, or the like.

After receiving user information at step 402, the user information is registered at step 404. At step 404, the information can be associated (i.e., registered) with a particular user account. For example, after entering user information at step 404, identifying information (e.g., the name of user account) may be linked to the user information. Subsequently, the user information may be stored on a server at step 406.

Once the user information has been received and stored on the server, the method advances to step 408 where the user information is scraped for location related information. A location scraper 214 may, in some implementations, comb the saved user information for location-related data. The location scraper 214 may parse text found in the user information for words, phrases, or numerical data indicative of a location. For example, the location scraper 214 may search for business names, travel directions, coordinate data, etc.

At step 410, a user may register to a user account with a second client device. In certain cases, the user account may be related to one or more web applications. The user may register to a user account by, for example, logging into the user account with any necessary login information, such as a user name and password, from, in an exemplary implementation, a portable computing device. Once the user has logged in, the server may authenticate the user's device at step 412. Authentication may occur by, for example, verifying that the username and password provided by the user are correct.

After the device has been authenticated, location information is transmitted at step 414. The location information scraped from user information at step 408 may be transmitted from the server to the client (here, the portable computing device), which saves the location information at step 416. Such transmitted information may include coordinates for various events associated with the user, along with descriptive information for the events, so that the events may be displayed on a map to the user.

Next, the movement of the device is monitored at step 418. For example, the device may continuously determine its location using location-tracking tools such as a GPS receiver. As the device monitors its location, it may detect any location-based data in the area at step 420. In some implementations, when the device determines its current location at step 418, it may search the location information provided by the server at step 414 for any location information within a predefined distance of its current location, or within a defined bounding box, which may be, for example, a box the size of the current map view or a box larger than the map view (e.g., several multiples of the map size on each side of the presently displayed map). For example, the location information provided by the server may include coordinate data (e.g., latitudes and longitudes). The client may, for example, determine which sets of latitudes and longitudes fall within a five mile radius of the device's current location.

If location-based data in the area has been identified, the method proceeds to optional step 422, where user data relating to the location-based data is obtained. In some implementations, the client may request user data from the server related to the identified location-based data. In response, the server, at step 424 may transmit user data correlated to the identified location-based data. For example, in some implementations, the location-based data supplied by the server may be associated with a contact, event, or task in one or more online applications. The server may transmit the contact, event, or task information that corresponds to the location-based data identified by the client. In an alternative implementation, user data associated with the identified location-based data may reside on the client.

Also, periodic queries may be made to another server such as a local search server, as a device moves. In particular, queries may relate to keywords found in a user's personal data. Also, keywords may take other forms, such as to seek advertising or promotional materials in the area of a user. As one example, if a user has an appointment for a "flight," a system may display advertisements for restaurants in the area of the arrival airport, under the assumption that the user will not have eaten on their airplane and will be receptive to advertisements for food.

At step 426, item detail is displayed. Item detail may be displayed in an information window 116 contiguous to a marker 118, 122 on the map. For example, an event's location, duration, and start time may be displayed in an information window 116 attached to an event marker 122.

Figure 4B:
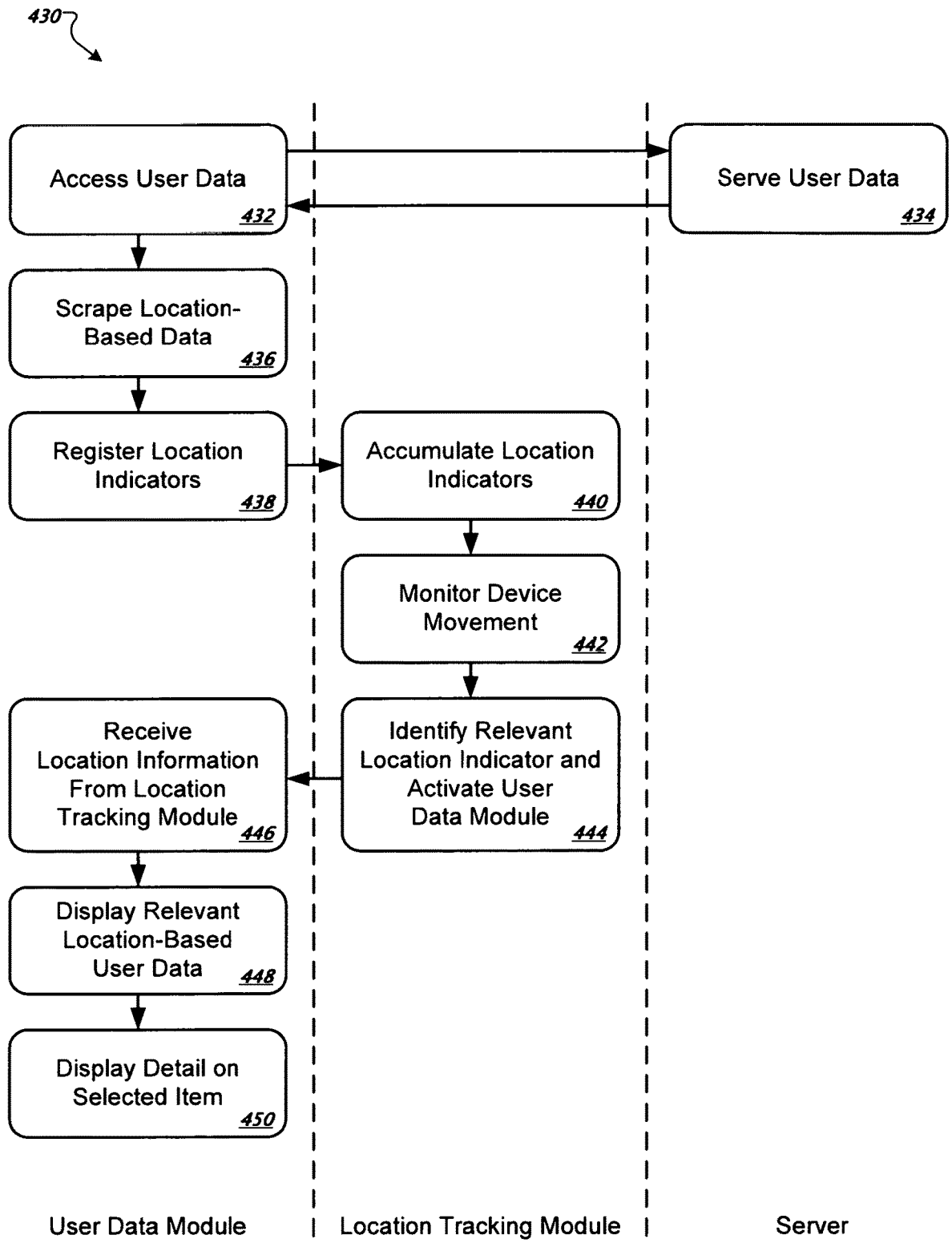
FIG. 4B illustrates an alternative exemplary method for creating a map that includes geocoded user information in a client-server environment.

FIG. 4B illustrates an alternative exemplary method for creating a map that includes geocoded user information in a client-server environment. Like the method 320 in FIG. 3B, this method depends on a location tracking module to help manage the monitoring of a mobile device's location and the alerting of applications that may depend on location-related data.

The method starts at step 432, where user data is accessed by a user data module. For example, the user data module may request user data (e.g., contacts, events, and tasks) from a server, which in step 434 serves the requested data to the user data module. A user may have previously entered such information, or may have received the information from others (such as using electronic business cards or via meeting requests). Subsequently, the user data is filtered for location-based data. For example, the user data module may locate and extract information in the user data that may be related to a location. For example, the user data module may extract monument names, intersections, addresses, etc.

After location-based data has been scraped or otherwise extracted at step 436, location indicators may be registered at step 438. In some implementations, the user data module may transform certain location-based data (e.g., place names and key words) into coordinate data. For example, the user data module may compare the place names and keywords with reference map data to determine whether any of the names and keywords correspond to a known location; if so, the matching place name or keywords may be associated, that is, registered, with the corresponding known location. At step 440, the location indicators may be accumulated. For example, the location indicators may be grouped and stored.

At step 442, the movement of the device is monitored by the location tracking module. In some implementations, the location tracking module may receive periodic location updates from the device, or the device may provide its location to the location tracking module in response to a request from the module. In other implementations, the tracking module may determine the device's location using location-tracking techniques such as performing a trilateration calculation.

Proceeding to step 444, relevant location indicators are identified that match the current location of the device and, in response, the user data module is activated. In some implementations, as the device moves, the location tracking module may determine whether any location indicators are within a predetermined distance of the device. For example, the device may be a PDA; as the user travels, the PDA may periodically notify the location tracking module of its location. The PDA may come within a preset distance, e.g., 10 miles (or x times the distance currently shown on a map), of a location indicator that, in this case, represents a coffeehouse. When the location tracking module detects that the PDA is within ten miles of the coffeehouse (by, for example, calculating the distance between reference map data representing the coffeehouse and the PDA), the location tracking module may notify the user data module by transmitting a signal or other appropriate notification means.

In addition to identifying relevant location indicators and activating a user data module, the location tracking module may transmit location information to the user data module, which is received by the data module at step 446. In response to receiving the location information, the user data module may display relevant location based information at step 448. For instance, the user data module may populate the displayed map with markers representing location based user data. In an illustrative example, as the user travels down a busy city street, contact and event markers representing data contained in online applications (e.g., nearby friends, co-workers, and events) may be displayed on the user's PDA.

Finally, at step 450, the user data module may display selected item details. In some implementations, in response to user input, the device may display information contained in online applications in an information widow close to the marker. For instance, the user may touch the screen where the marker is displayed or select the marker using a keypad, mouse or other peripheral device. The system may respond by displaying contact or event information associated with the marker in an information window attached to the maker. For example, when the user selects a marker corresponding to a task, the status of the task may be displayed (e.g., completed or pending), the task's due date, and any other applicable information.

Figure 5:
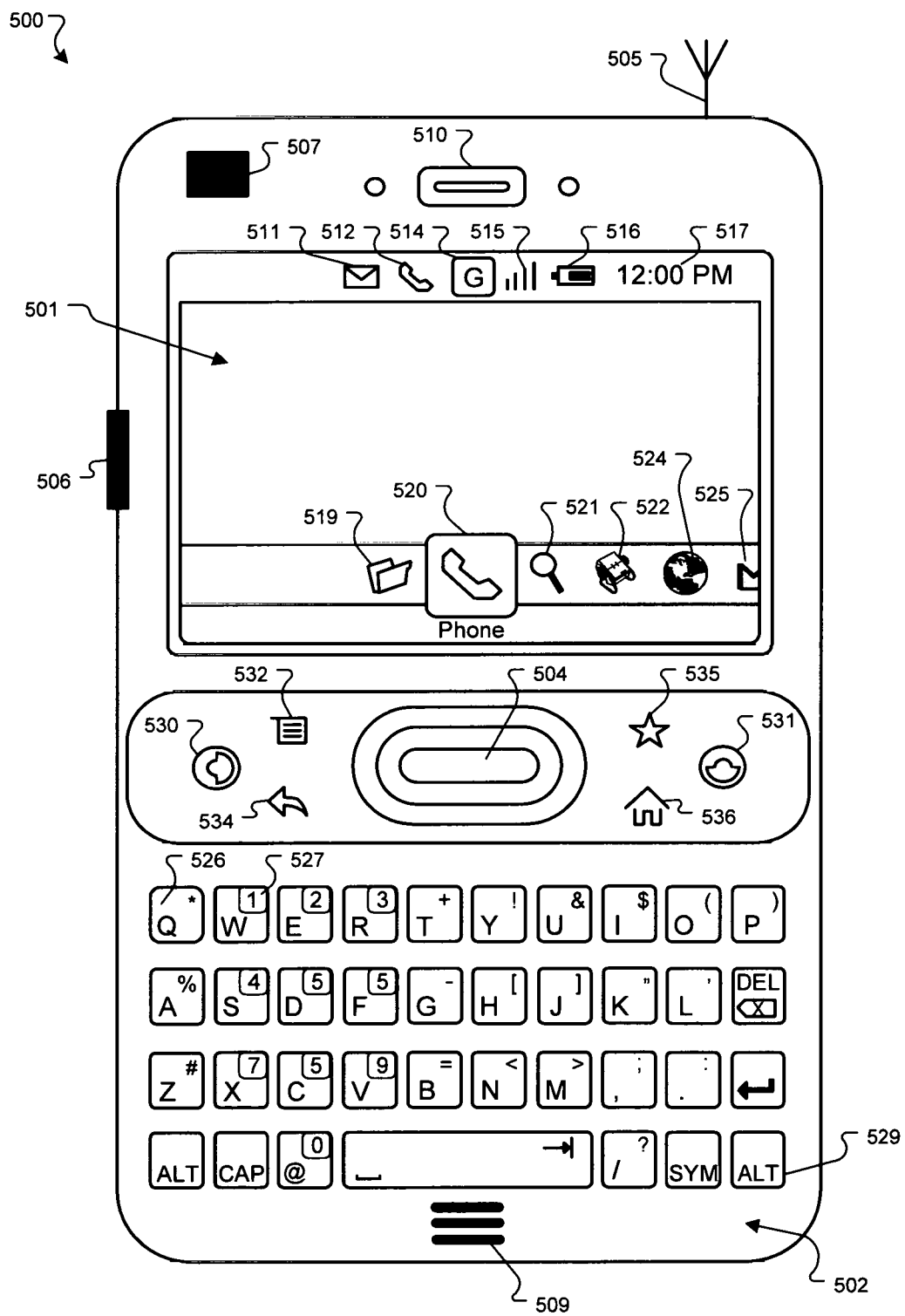
FIG. 5 shows the exterior appearance of an exemplary device that implements various aspects of the exemplary mapping system.

Referring now to FIG. 5, the exterior appearance of an exemplary device 500 that implements various aspects of a mapping system capable of geocoding personal information is illustrated. Briefly, and among other things, the device 500 includes a processor configured to connect to a mapping system capable of geocoding personal information and perform various functions, some of which have been described above in relation to a mapping system running on the device 500, upon request of a user of the mobile device.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for displaying, configuring, and viewing various applications. The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 6GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WIDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE®-1394 FIREWIRE® connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 6 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
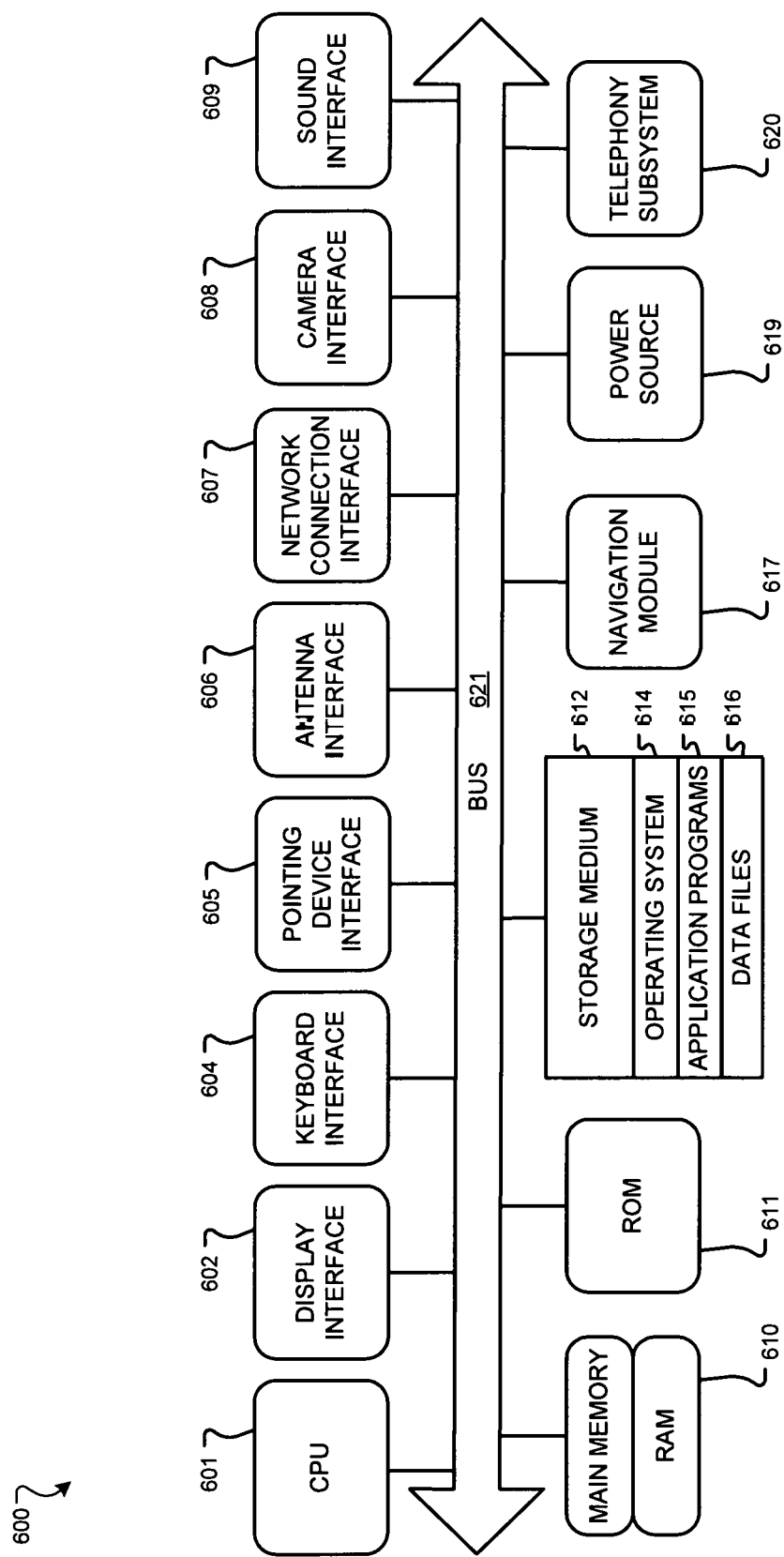
FIG. 6 is a block diagram illustrating an internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that allow a user to fully implement and use various applications simultaneously. In some embodiments, the computer program product includes functionality for accepting amendments to the software, for example, updating the computer program product to correct "bugs" or glitches in the software or hardware operations. In some embodiments, the updating can include adding additional elements and features to the computer program product that improve its utility.

The operating system 614 may be a LINUX®-based operating system such as the GOOGLE® mobile device platform; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 614 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVA™ programming language; PYTHON™, FLASH LITE®, or MICROSOFT® .NET Compact, or another appropriate environment. The application development platform may also use the SUN MICROSYSTEMS® JAVA™ programming language and the Dalvik virtual machine.

The device stores computer-executable code for the operating system 614, and the application programs 615 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 615 may also include a widget or gadget engine, such as a TAFRI™ widget engine, a MICROSOFT® gadget engine such as the WINDOWS SIDEBAR® gadget engine or the KAPSULES™ gadget engine, a YAHOO! widget engine such as the KONFABULTOR™ widget engine, the APPLE® DASHBOARD® widget engine, the GOGGLE® gadget engine, the KLIPFOLIO® widget engine, an OPERA™ widget engine, the WIDGETS™ widget engine, a proprietary widget or gadget engine, or other widget or gadget engine the provides host system software for a physically-inspired applet on a desktop.

Although it is possible to provide for implementing a application manager using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 617 may determine an absolute or relative position of the device, such as by using the Global Positioning System (GPS) signals, Cell Tower Triangulation, Wifi Access Point Identification, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
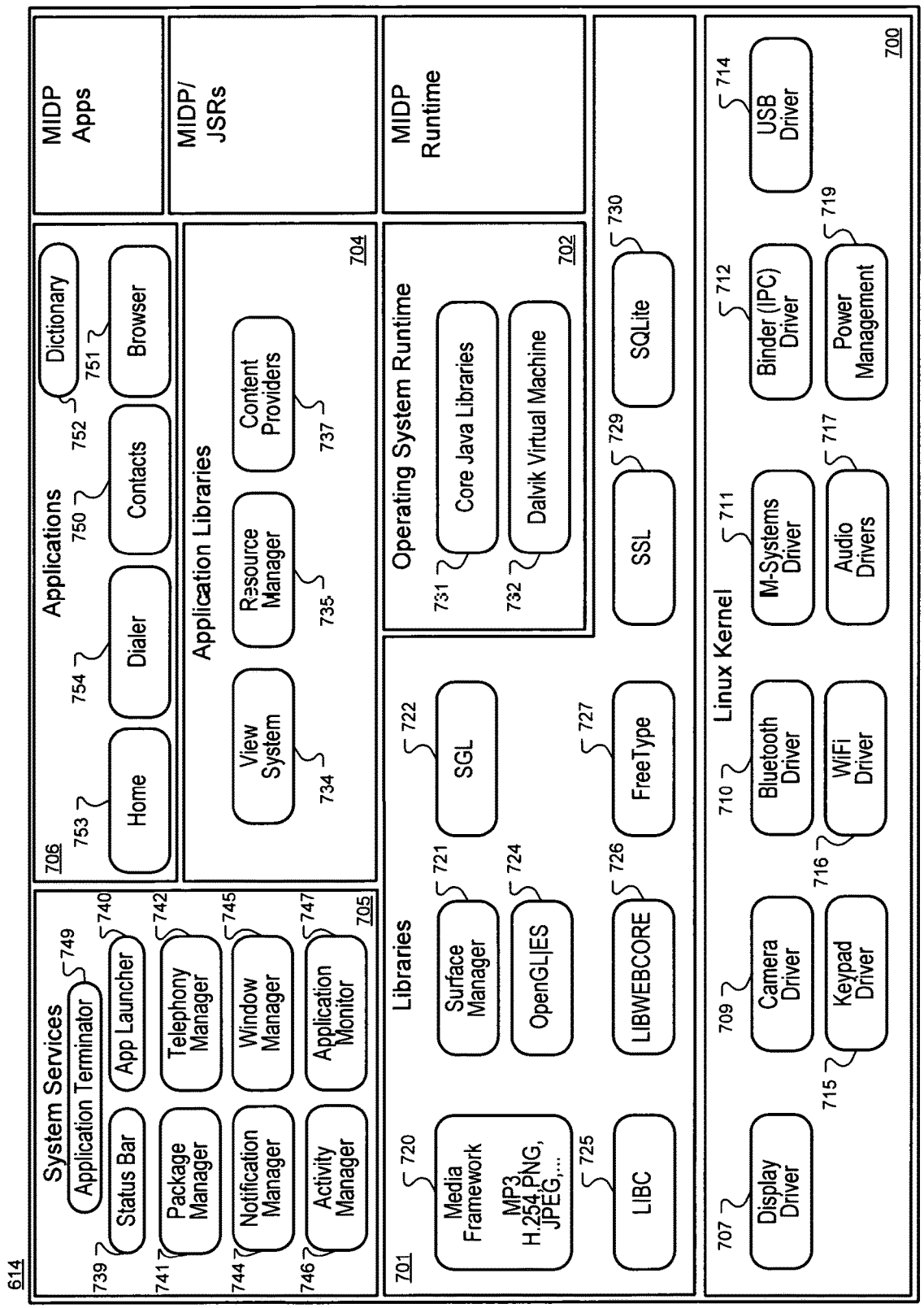
FIG. 7 is a block diagram illustrating exemplary components of the operating system used by the device, in the case where the operating system is the GOOGLE mobile device platform

FIG. 7 is a block diagram illustrating exemplary components of the operating system 614 used by the device 500, in the case where the operating system 614 is the GOOGLE® mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 615 to interact with the display 501 via the display interface 602, a camera driver 709 that allows the software to interact with the camera 507; a BLUETOOTH® driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 619.

The BLUETOOTH® driver, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joing Photographic Experts Group (JPEG), and others) using an efficient JAVA® Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702, which generally makes up a Mobile Information Device Profile (MIDP) runtime, includes core JAVA libraries 731, and a Dalvik virtual machine 732. The Dalvik virtual machine 732 is a custom, JAVA-compatible virtual machine that runs a customized file format (.DEX) as well as unmodified JAVA files (.CLASS/.JAR). With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704, which generally make up the MIDP JAVA® Specification Requests (JSRs), includes a view system 734, a resource manager 735, and content providers 737. The system services 705 includes a status bar 739; an application launcher 740; a package manager 741 that maintains information for all installed applications; a telephony manager 742 that provides an application level JAVA® interface to the telephony subsystem 620; a notification manager 744 that allows all applications access to the status bar and on-screen notifications; a window manager 745 that allows multiple applications with multiple windows to share the display 501; an activity manager 746 that runs each application in a separate process, manages an application life cycle, and maintains a cross-application history; an application monitor 747 to monitor state changes in the applications; and an application terminator 749 to terminate one or more applications.

The applications 706, which generally make up the MIDP applications, include a home application 753, a dialer application 754, a contacts application 750, a browser application 751, and a dictionary application 752.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
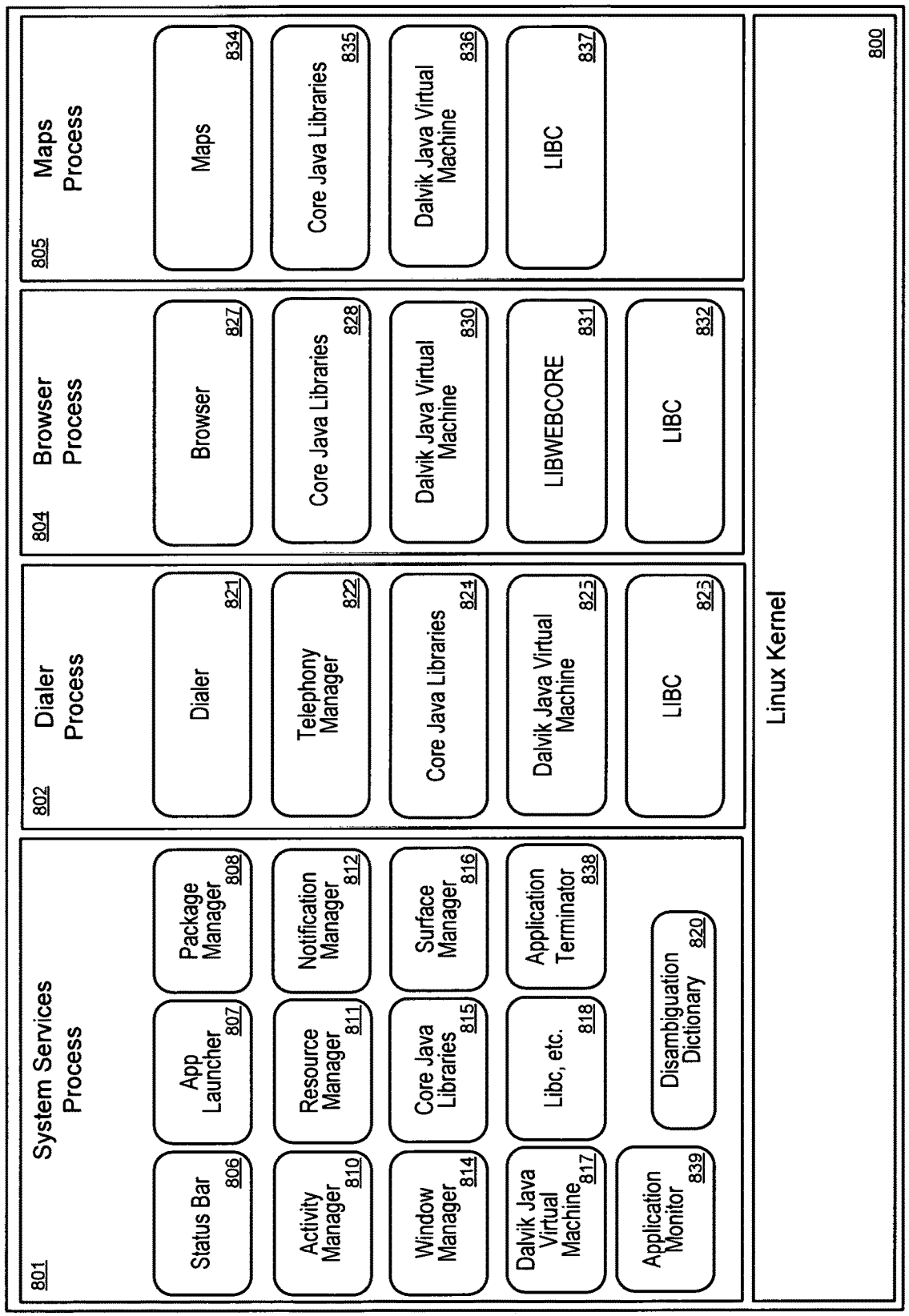
FIG. 8 is a block diagram illustrating exemplary processes executed in userspace atop the operating system kernel.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 816, the window manager 814, or the activity manager 810, are hosted by system processes, although application processes, such processes associated with the dialer application 821, may also be persistent. The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 808 associated with the package manager 741; activity manager processes 810 associated with the activity manager 746; resource manager processes 811 associated with a resource manager (not shown) that provides access to graphics, localized strings, and XML layout descriptions; notification manager processes 812 associated with the notification manager 744; window manager processes 814 associated with the window manager 745; core JAVA® libraries processes 815 associated with the core JAVA® libraries 731; surface manager processes 816 associated with the surface manager 721; Dalvik JAVA® virtual machine processes 817 associated with the Dalvik virtual machine 732, LIBC processes 818 associated with the LIBC library 725; application terminator processes 838 associated with the application terminator 749; and application monitor processes 839 associated with the application monitor 747.

The dialer processes 802 include dialer application processes 821 associated with the dialer application 754 telephony manager processes 822 associated with the telephony manager 742; core JAVA® libraries processes 824 associated with the core JAVA® libraries 731; Dalvik JAVA® virtual machine processes 825 associated with the Dalvik Virtual machine 732; and LIBC processes 826 associated with the LIBC library 725. The browser processes 804 include browser application processes 827 associated with the browser application 751; core JAVA® libraries processes 828 associated with the core JAVA® libraries 731; Dalvik JAVA® virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA® libraries processes 835, Dalvik JAVA® virtual machine processes 836, and LIBC processes 837. Notably, some processes, such as the Dalvik JAVA® virtual machine processes, may exist within one or more of the systems services processes 801, the dialer processes 802, the browser processes 804, and the maps processes 805.

Figure 9:
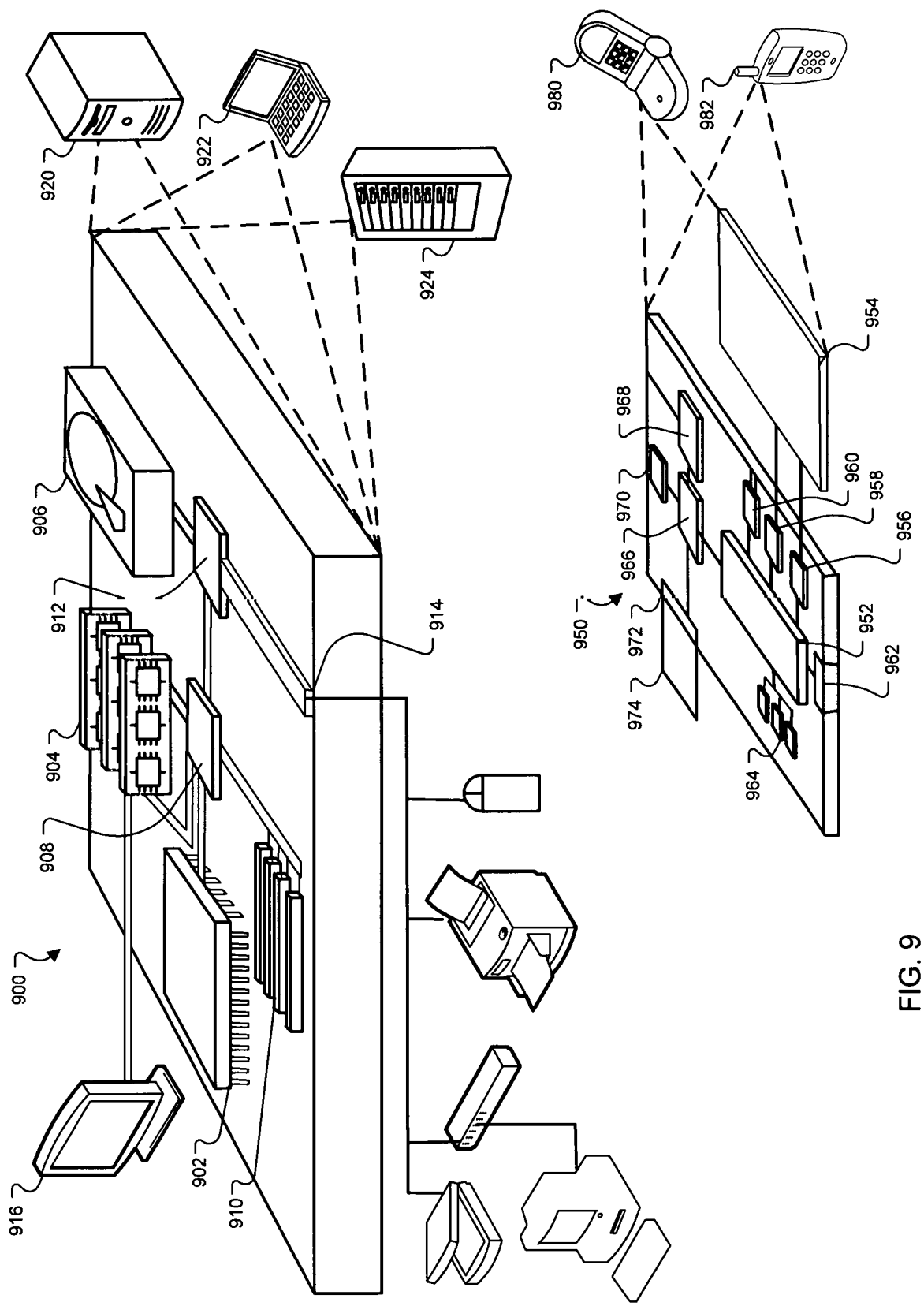
FIG. 9 shows an example of a generic computer device and a generic mobile computer device, which may be used with the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 1050, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. For example, while the above disclosure uses the term "telephony," it is implied that other forms of communication that don't necessarily use telephones, such as voice-over-IP systems are considered equivalent with regard to the ability to connect one person to another over transmission lines or wirelessly. Accordingly, other embodiments are within the scope of the following claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    identifying a user entry from an account of a user;
    determining a geo-location for the user entry;
    displaying, on a screen of a computing device, a map of a geographic area and a graphical representation of the user entry, wherein the graphical representation of the user entry is overlaid on the map of the geographic area at a position of the map corresponding to the geo-location for the user entry;
    submitting, to a search engine, one or more terms from the user entry;
    obtaining search results from the search engine based on the one or more terms from the user entry;
    identifying, by the computing device, a user interaction with the graphical representation of the user entry; and
    in response to identifying the user interaction with the graphical representation of the user entry, displaying in an information window additional information about the user entry that was not initially displayed with the graphical representation of the user entry, wherein the additional information displayed in the information window includes (i) a summary of the search results that were obtained based on the one or more terms from the user entry, or (ii) at least one of the search results that were obtained based on the one or more terms from the user entry.

2. The computer-implemented method of claim 1, wherein identifying the user entry from the account of the user comprises obtaining the user entry from user data managed by a first application on the computing device, wherein the first application is separate from a second application that provides the map for display on the computing device.

3. The computer-implemented method of claim 1, wherein determining the geo-location for the user entry comprises converting a textual address associated with the user entry to geographic coordinates.

4. The computer-implemented method of claim 1, further comprising displaying the information window as a pop-up box that appears on the screen of the computing device in response to identifying the user interaction with the graphical representation of the user entry.

5. The computer-implemented method of claim 1, wherein the user entry is a contact from a contact list of the user, and the geo-location for the user entry is a location of an address associated with the contact.

6. The computer-implemented method of claim 1, wherein the one or more terms extracted from the user entry indicate a contact or an event.

7. The computer-implemented method of claim 1, wherein determining the geo-location for the user entry comprises submitting a term from the user entry to a local search engine and obtaining, from the local search engine, a geo-location for an establishment where a task associated with the user entry can be completed.

8. The computer-implemented method of claim 1, further comprising:
    determining an estimated time of arrival of the computing device at the geo-location for the user entry; and
    displaying, in the information window, an indication of the estimated time of arrival of the computing device at the geo-location for the user entry.

9. The computer-implemented method of claim 1, further comprising overlaying the information window on the map of the geographic area, and positioning the information window adjacent to the graphical representation of the user entry.

10. The computer-implemented method of claim 1, further comprising:
    overlaying the information window on the map of the geographic area;
    displaying as overlays on the map of the geographic area a plurality of markers, wherein the graphical representation of the user entry is one of the plurality of markers; and
    positioning the information window over the map of the geographic area based on a number of the plurality of markers that would be obscured by the information window.

11. The computer-implemented method of claim 10, wherein positioning the information window over the map of the geographic area based on the number of the plurality of markers that would be obscured by the information window comprises positioning the information window so as to minimize the number of the plurality of markers that would be obscured by the information window.

12. The computer-implemented method of claim 1, further comprising:
    determining a direction of travel of the computing device;
    overlaying the information window on the map of the geographic area; and positioning the information window over the map of the geographic area away from the direction of travel of the computing device.

13. The computer-implemented method of claim 1, wherein the user entry identifies an event, and the method further comprises:
   obtaining information describing a real-time status of the event; and
   displaying the real-time status of the event in the information window.

14. The computer-implemented method of claim 13, further comprising:
   periodically obtaining information describing updates to the real-time status of the event; and
   updating the information window to reflect the information describing the updates to the real-time status of the event.

15. A computer-implemented method, comprising:
   identifying a user entry from an account of a user;
   determining a geo-location for the user entry;
   displaying, on a screen of a computing device, a map of a geographic area and a graphical representation of the user entry, wherein the graphical representation of the user entry is overlaid on the map of the geographic area at a position of the map corresponding to the geo-location for the user entry;
   identifying, by the computing device, a user interaction with the graphical representation of the user entry;
   in response to identifying the user interaction with the graphical representation of the user entry, displaying in an information window additional information about the user entry that was not initially displayed with the graphical representation of the user entry;
   monitoring a distance between a current location of the computing device and the geo-location for the user entry; and
   automatically displaying the additional information about the user entry in response to determining that the distance between the current location of the computing device and the geo-location for the user entry is within a predetermined distance.

16. One or more non-transitory computer-readable media having instructions stored thereon that, when executed by one or more processors, cause the one or more processors to perform operations comprising:
   identifying a user entry from an account of a user;
   determining a geo-location for the user entry;
   displaying, on a screen of a computing device, a map of a geographic area and a graphical representation of the user entry, wherein the graphical representation of the user entry is overlaid on the map of the geographic area at a position of the map corresponding to the geo-location for the user entry;
   submitting, to a search engine, one or more terms from the user entry;
   obtaining search results from the search engine based on the one or more terms from the user entry;
   identifying, by the computing device, a user interaction with the graphical representation of the user entry; and
   in response to identifying the user interaction with the graphical representation of the user entry, displaying in an information window additional information about the user entry that was not initially displayed with the graphical representation of the user entry, wherein the additional information displayed in the information window includes (i) a summary of the search results that were obtained based on the one or more terms from the user entry, or (ii) at least one of the search results that were obtained based on the one or more terms from the user entry.

17. The one or more non-transitory computer-readable media of claim 16, wherein identifying the user entry from the account of the user comprises obtaining the user entry from user data managed by a first application on the computing device, wherein the first application is separate from a second application that provides the map for display on the computing device.

18. The one or more non-transitory computer-readable media of claim 16, wherein determining the geo-location for the user entry comprises converting a textual address associated with the user entry to geographic coordinates.

* * * * *